(12) United States Patent  
Ichikawa et al.

(10) Patent No.: US 8,165,463 B2  
(45) Date of Patent: *Apr. 24, 2012

(54) ZOOM OPTICAL SYSTEM AND ELECTRONIC IMAGING APPARATUS USING THE SAME

(75) Inventors: Keisuke Ichikawa, Hachioji (JP); Shinichi Mihara, Tama (JP)

(73) Assignee: Olympus Corporation, Tokyo (JP)

(*) Notice: Subject to any disclaimer, the term of this patent is extended or adjusted under 35 U.S.C. 154(b) by 1406 days.

This patent is subject to a terminal disclaimer.

(21) Appl. No.: 11/731,365

(22) Filed: Mar. 29, 2007

(65) Prior Publication Data

US 2008/0117315 A1  May 22, 2008

(30) Foreign Application Priority Data

Nov. 22, 2006 (JP) .................. 2006-316192

(51) Int. Cl.  
G03B 17/00 (2006.01)

(52) U.S. Cl. ............................................. 396/72

(58) Field of Classification Search ............ 396/72; 348/240.3  
See application file for complete search history.

(56) References Cited

U.S. PATENT DOCUMENTS

| | | | |
|---|---|---|---|
| 6,349,002 B1 | 2/2002 | Shibayama et al. | |
| 7,403,345 B2 * | 7/2008 | Ichikawa et al. | 359/781 |
| 7,522,347 B2 * | 4/2009 | Ichikawa et al. | 359/680 |
| 7,535,652 B2 * | 5/2009 | Ichikawa et al. | 359/686 |
| 2002/0008920 A1 | 1/2002 | Mihara et al. | |
| 2002/0057502 A1 | 5/2002 | Ishii et al. | |
| 2005/0207024 A1 * | 9/2005 | Mihara | 359/689 |

FOREIGN PATENT DOCUMENTS

| | | |
|---|---|---|
| JP | 11-211984 | 8/1999 |
| JP | 2005-055496 | 3/2005 |
| JP | 2005-331860 | 12/2005 |
| JP | 2006-023438 | 1/2006 |
| JP | 2007-065590 | 3/2007 |
| JP | 2007-155836 | 6/2007 |
| JP | 2008-058600 | 3/2008 |

* cited by examiner

*Primary Examiner* — Clayton E Laballe  
*Assistant Examiner* — Noam Reisner  
(74) *Attorney, Agent, or Firm* — Kenyon & Kenyon LLP

(57) ABSTRACT

An electronic imaging apparatus has a zoom optical system in which the most object-side lens unit A includes one biconcave-shaped negative lens component, each of air-contact-surfaces of which is configured as an aspherical surface, and when the magnification of the zoom optical system is changed in the range from a wide-angle position to a telephoto position, the lens unit A is moved back and forth along the optical axis in such a way that the lens unit A is initially moved toward the image side, and an electronic imaging unit that has an electronic image sensor so that image data picked up by the electronic image sensor are electrically processed and can be output as image data whose format is changed. In this case, in nearly infinite object point focusing, the zoom optical system satisfies the following condition:

$$0.7 < y_{07}/(f_w \cdot \tan \omega_{07w}) < 0.94$$

where $y_{07}$ is expressed by $y_{07} = 0.7 y_{10}$ when $y_{10}$ denotes a distance from the center to a point farthest from the center within an effective imaging surface of the electronic image sensor, $\omega_{07w}$ is an angle made by a direction of an object point corresponding to an image point, connecting the center of the imaging surface at the wide-angle position and the position of the image height $y_{07}$, with the optical axis, and $f_w$ is the focal length of the entire system of the zoom optical system at the wide-angle position.

50 Claims, 16 Drawing Sheets

SPHERICAL ABERRATION
FNO 1.860

-0.10   0.10
(mm)

ASTIGMATISM
IH=3.60

-0.10   0.10
(mm)

DISTORTION
IH=3.60

-10.00   10.00
(%)

CHROMATIC ABERRATION OF MAGNIFICATION
IH=3.60

-0.02   0.02
(mm)

SPHERICAL ABERRATION
FNO 2.453

-0.10   0.10
(mm)

ASTIGMATISM
IH=3.60

-0.10   0.10
(mm)

DISTORTION
IH=3.60

-10.00   10.00
(%)

CHROMATIC ABERRATION OF MAGNIFICATION
IH=3.60

-0.02   0.02
(mm)

SPHERICAL ABERRATION
FNO 3.404

-0.10   0.10
(mm)

ASTIGMATISM
IH=3.60

-0.10   0.10
(mm)

DISTORTION
IH=3.60

-10.00   10.00
(%)

CHROMATIC ABERRATION OF MAGNIFICATION
IH=3.60

-0.02   0.02
(mm)

404.66 —··—··—   486.13 —·—·—   587.56 ———
435.83 ————   656.27 ---------

FIG.4A
SPHERICAL ABERRATION
FNO 2.131
FIG.4B
ASTIGMATISM
IH=3.60
FIG.4C
DISTORTION
IH=3.60
FIG.4D
CHROMATIC ABERRATION OF MAGNIFICATION
IH=3.60
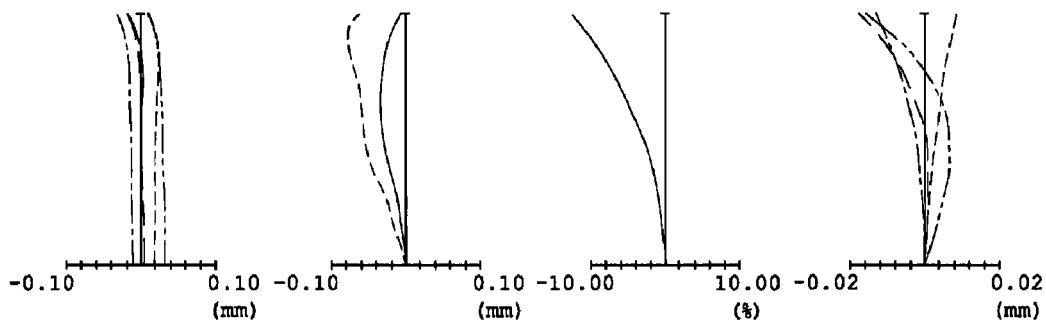
FIG.4E
SPHERICAL ABERRATION
FNO 2.688
FIG.4F
ASTIGMATISM
IH=3.60
FIG.4G
DISTORTION
IH=3.60
FIG.4H
CHROMATIC ABERRATION OF MAGNIFICATION
IH=3.60
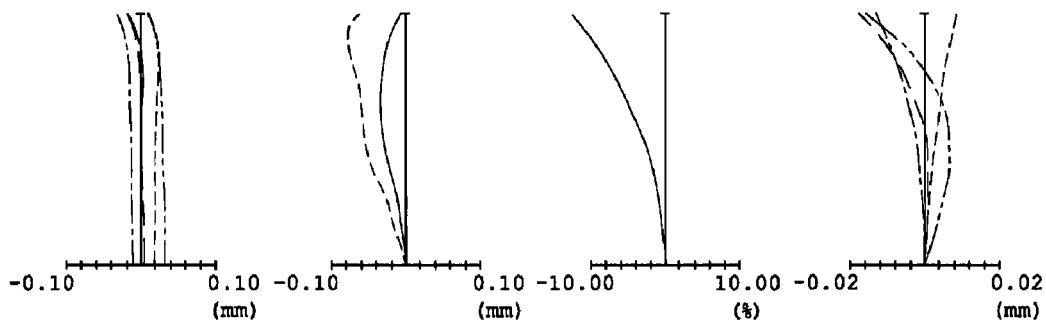
FIG.4I
SPHERICAL ABERRATION
FNO 3.578
FIG.4J
ASTIGMATISM
IH=3.60
FIG.4K
DISTORTION
IH=3.60
FIG.4L
CHROMATIC ABERRATION OF MAGNIFICATION
IH=3.60
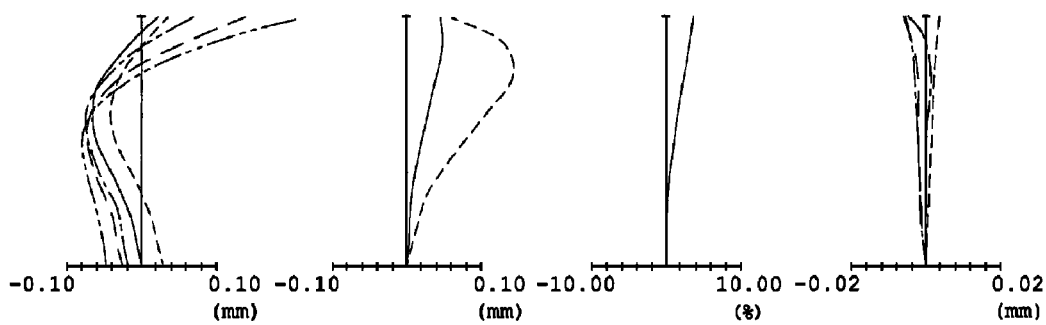
404.66 —·—·—   486.13 —··—··—   587.56 ————
435.83 — — —   656.27 ·········

FIG.6A
SPHERICAL ABERRATION
FNO 2.307
FIG.6B
ASTIGMATISM
IH=3.60
FIG.6C
DISTORTION
IH=3.60
FIG.6D
CHROMATIC ABERRATION OF MAGNIFICATION
IH=3.60
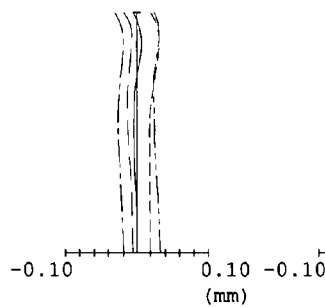
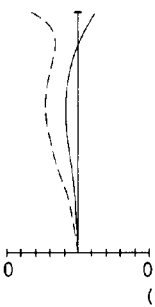
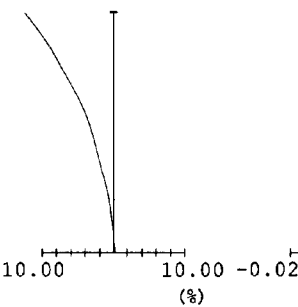
FIG.6E
SPHERICAL ABERRATION
FNO 2.916
FIG.6F
ASTIGMATISM
IH=3.60
FIG.6G
DISTORTION
IH=3.60
FIG.6H
CHROMATIC ABERRATION OF MAGNIFICATION
IH=3.60
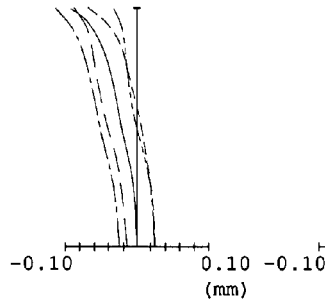
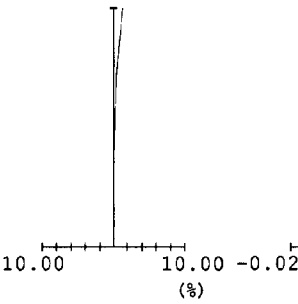
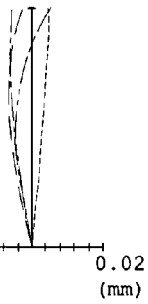
FIG.6I
SPHERICAL ABERRATION
FNO 3.997
FIG.6J
ASTIGMATISM
IH=3.60
FIG.6K
DISTORTION
IH=3.60
FIG.6L
CHROMATIC ABERRATION OF MAGNIFICATION
IH=3.60
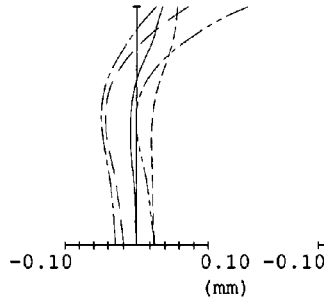
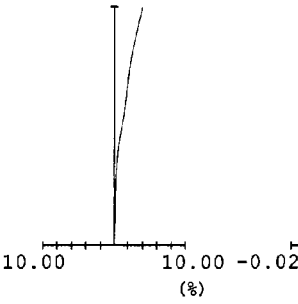
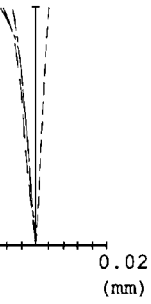
404.66 — · · —
435.83 — — —
486.13 — — —
656.27 - - - - -
587.56 ———

FIG.8A
SPHERICAL ABERRATION
FNO 1.849
FIG.8B
ASTIGMATISM
IH=3.60
FIG.8C
DISTORTION
IH=3.60
FIG.8D
CHROMATIC ABERRATION OF MAGNIFICATION
IH=3.60
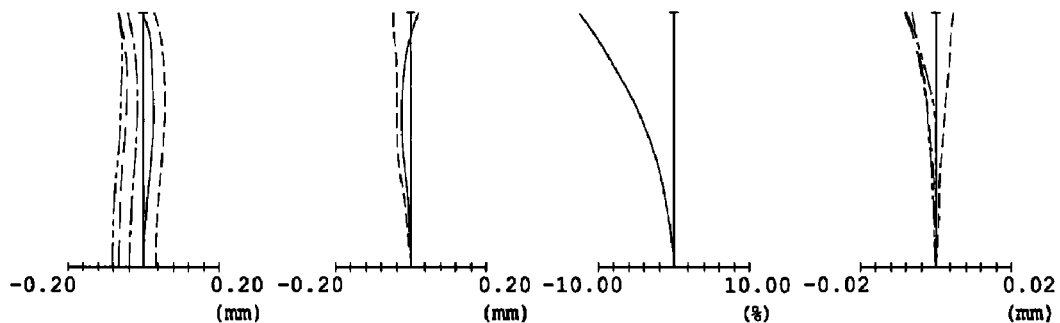
FIG.8E
SPHERICAL ABERRATION
FNO 2.456
FIG.8F
ASTIGMATISM
IH=3.60
FIG.8G
DISTORTION
IH=3.60
FIG.8H
CHROMATIC ABERRATION OF MAGNIFICATION
IH=3.60
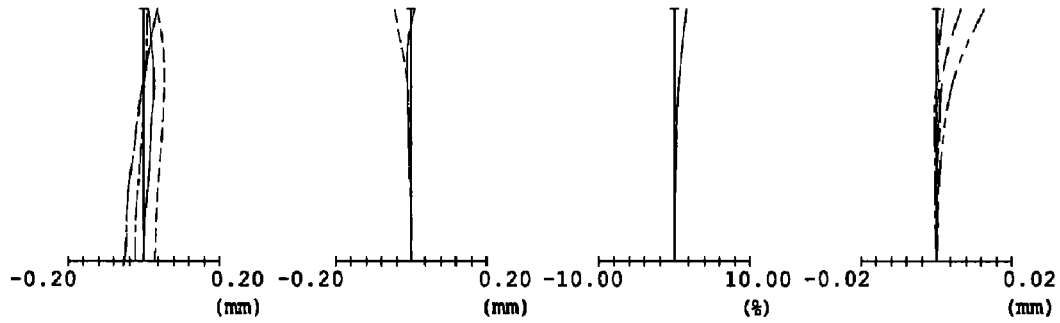
FIG.8I
SPHERICAL ABERRATION
FNO 3.392
FIG.8J
ASTIGMATISM
IH=3.60
FIG.8K
DISTORTION
IH=3.60
FIG.8L
CHROMATIC ABERRATION OF MAGNIFICATION
IH=3.60
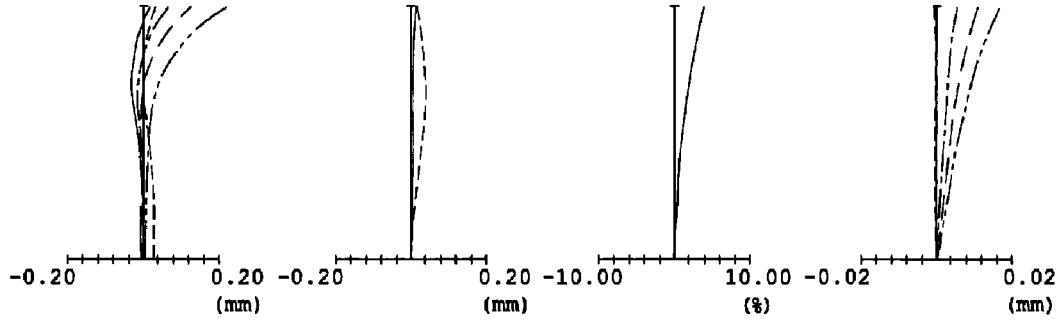
404.66 — — —   486.13 — — —   587.56 ———
435.83 — — — —   656.27 — — — — —

FIG.10A
SPHERICAL ABERRATION
FNO 1.869
FIG.10B
ASTIGMATISM
IH=3.60
FIG.10C
DISTORTION
IH=3.60
FIG.10D
CHROMATIC ABERRATION OF MAGNIFICATION
IH=3.60
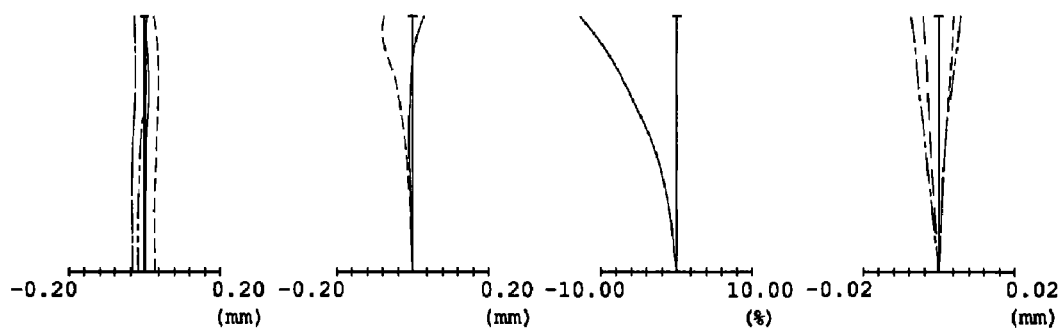
FIG.10E
SPHERICAL ABERRATION
FNO 2.462
FIG.10F
ASTIGMATISM
IH=3.60
FIG.10G
DISTORTION
IH=3.60
FIG.10H
CHROMATIC ABERRATION OF MAGNIFICATION
IH=3.60
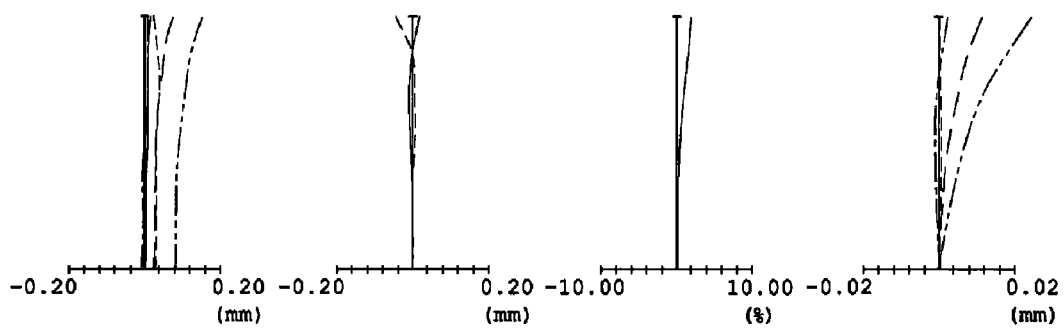
FIG.10I
SPHERICAL ABERRATION
FNO 3.424
FIG.10J
ASTIGMATISM
IH=3.60
FIG.10K
DISTORTION
IH=3.60
FIG.10L
CHROMATIC ABERRATION OF MAGNIFICATION
IH=3.60
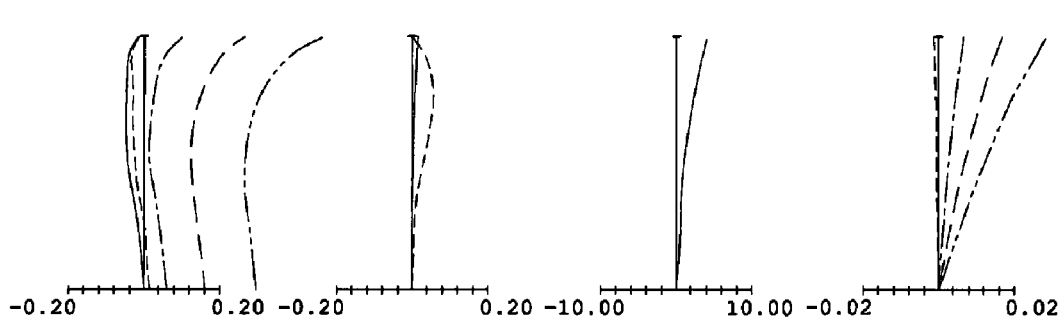
404.66 —·—·—  486.13 —··—··—  587.56 ———
435.84 ————  656.27 ----------

FIG.12A — SPHERICAL ABERRATION — FNO 1.842
FIG.12B — ASTIGMATISM — IH=3.60
FIG.12C — DISTORTION — IH=3.60
FIG.12D — CHROMATIC ABERRATION OF MAGNIFICATION — IH=3.60

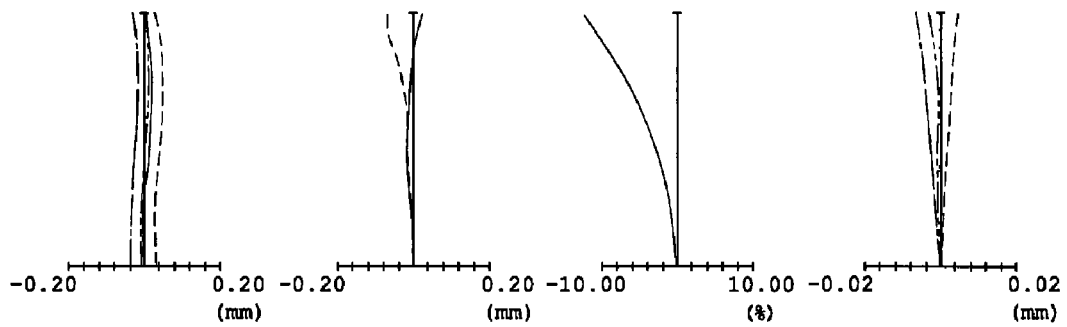
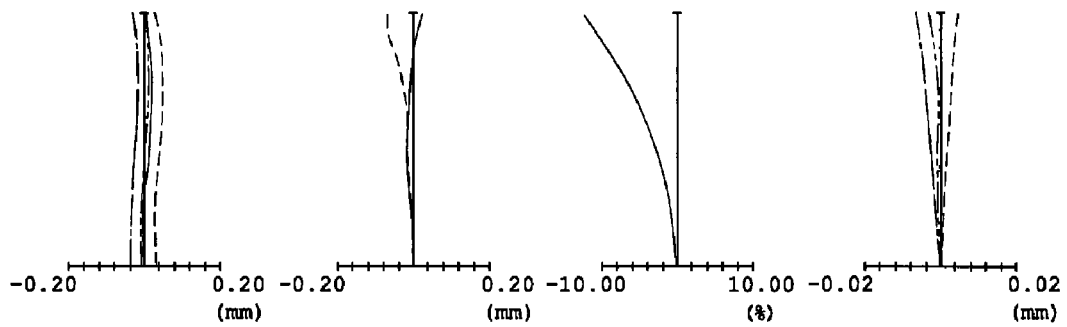
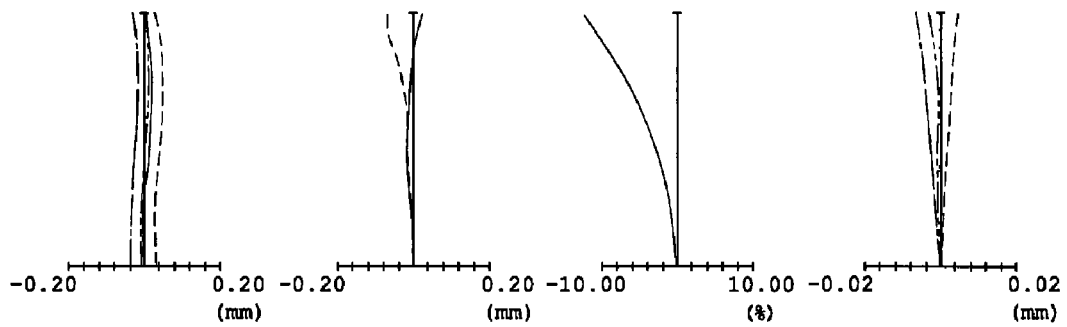
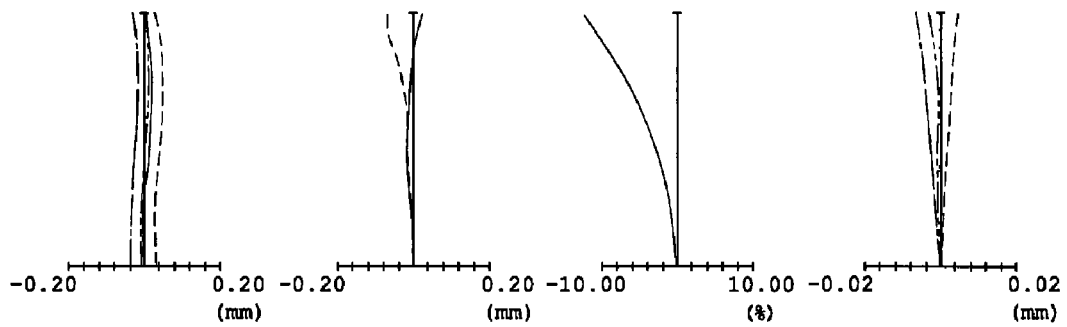

FIG.12E — SPHERICAL ABERRATION — FNO 2.426
FIG.12F — ASTIGMATISM — IH=3.60
FIG.12G — DISTORTION — IH=3.60
FIG.12H — CHROMATIC ABERRATION OF MAGNIFICATION — IH=3.60

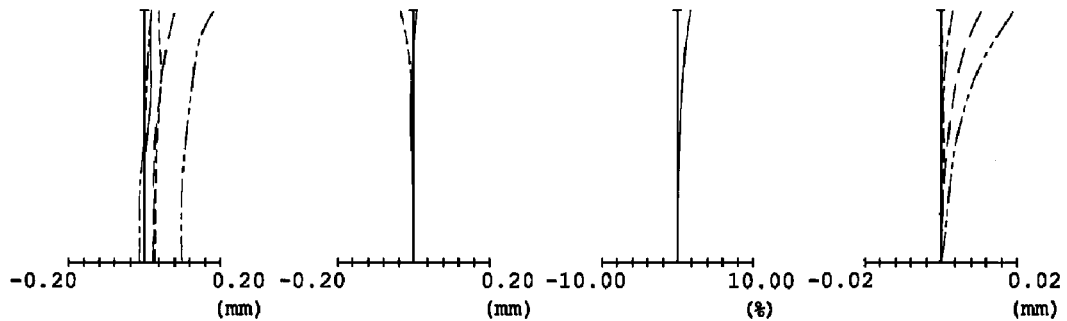
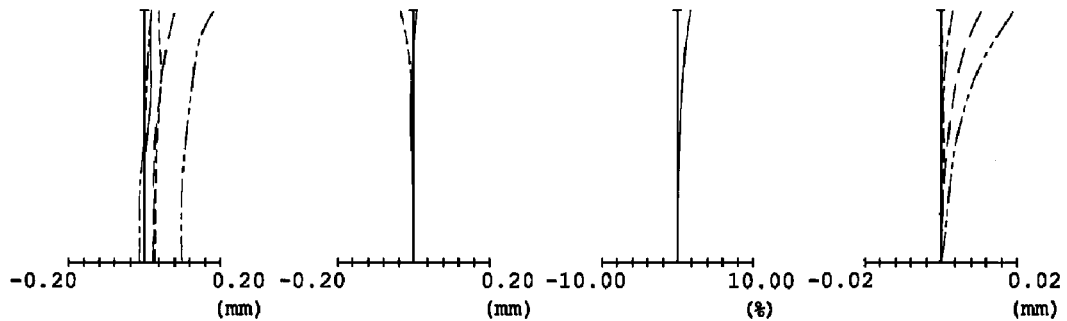
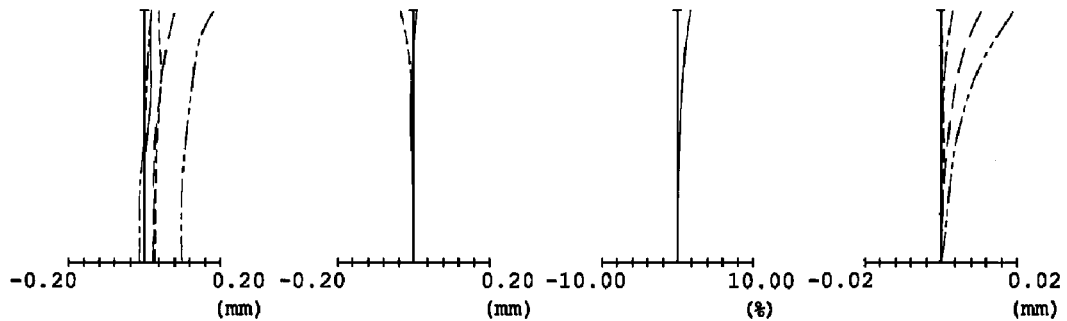
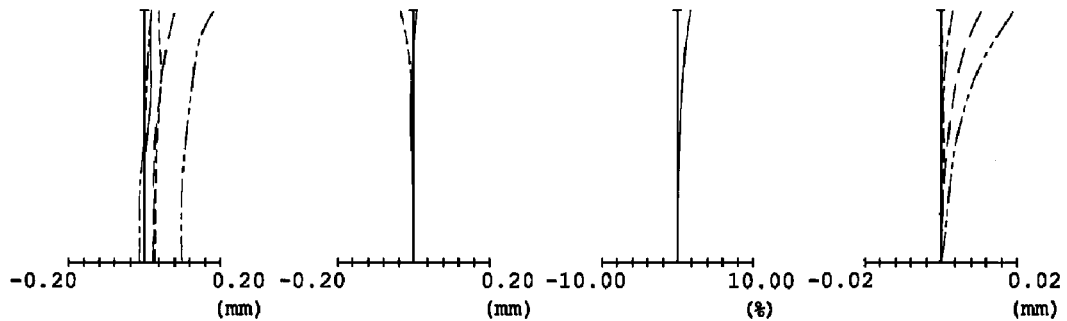

FIG.12I — SPHERICAL ABERRATION — FNO 3.379
FIG.12J — ASTIGMATISM — IH=3.60
FIG.12K — DISTORTION — IH=3.60
FIG.12L — CHROMATIC ABERRATION OF MAGNIFICATION — IH=3.60

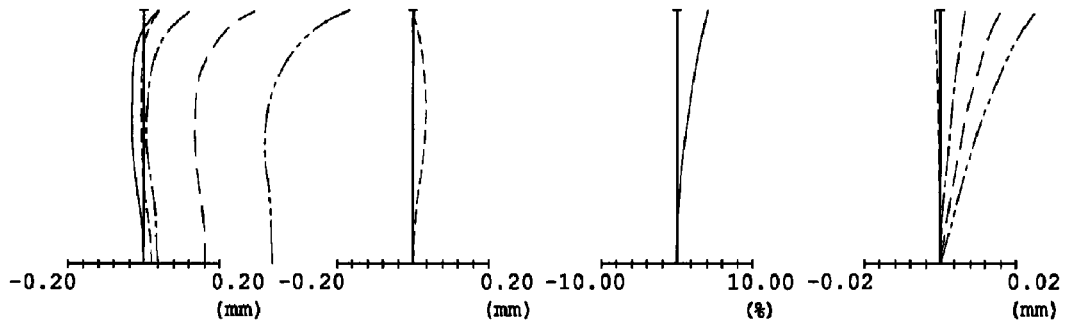
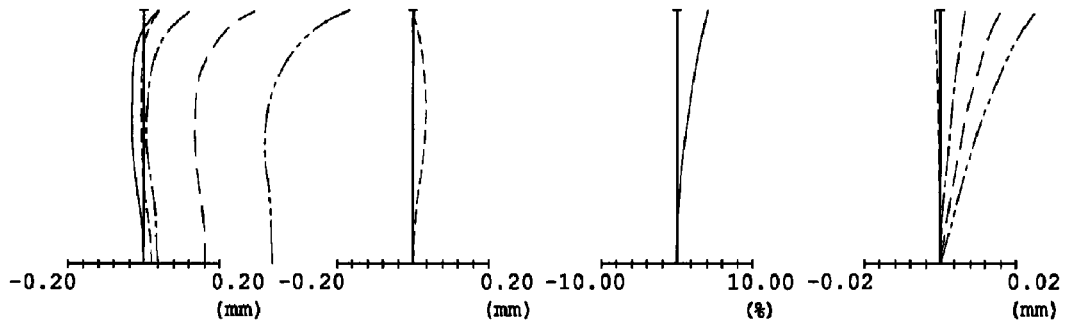
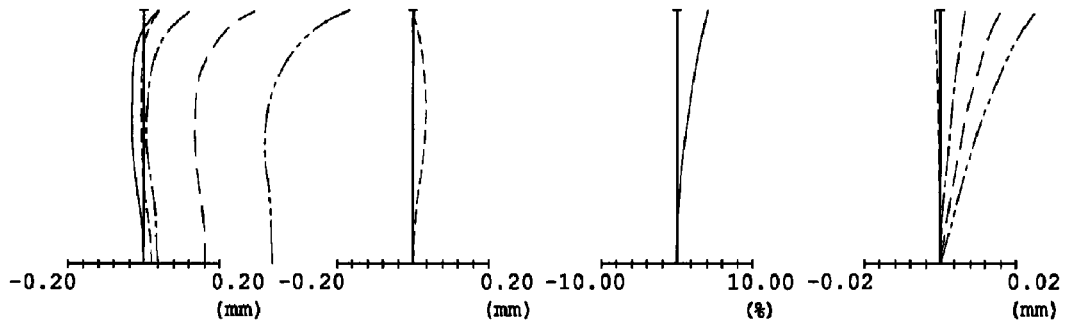
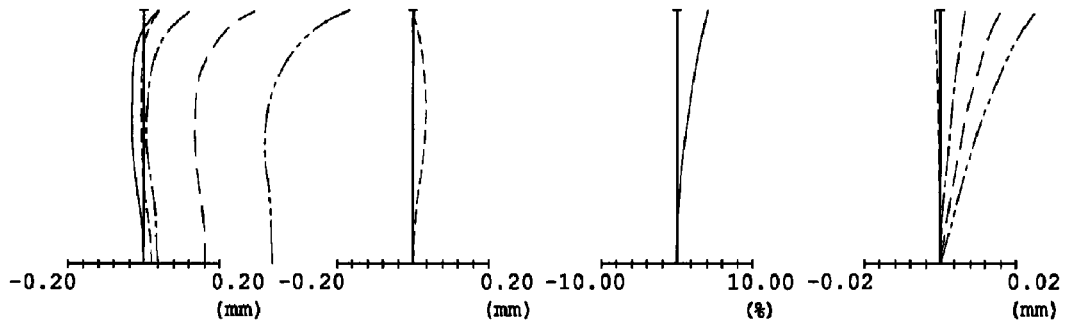

404.66 — · — 486.13 — · · — 587.56 ———
435.84 — — — 656.27 ----------

FIG.14A
SPHERICAL ABERRATION
FNO 2.601
FIG.14B
ASTIGMATISM
IH=3.84
FIG.14C
DISTORTION
IH=3.84
FIG.14D
CHROMATIC ABERRATION OF MAGNIFICATION
IH=3.84
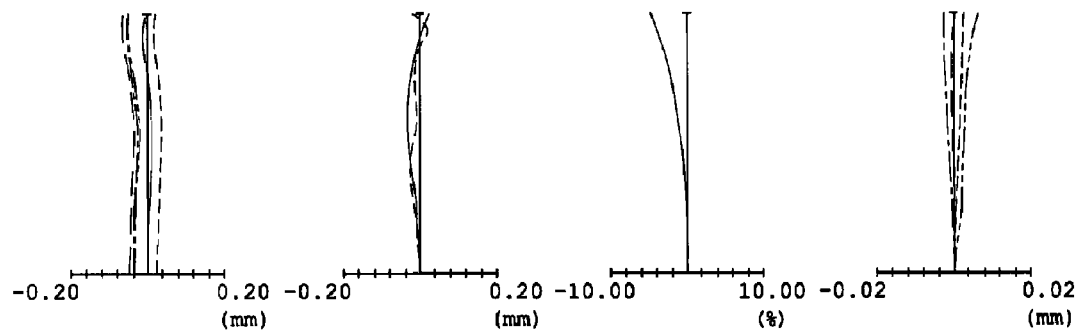
FIG.14E
SPHERICAL ABERRATION
FNO 3.440
FIG.14F
ASTIGMATISM
IH=3.84
FIG.14G
DISTORTION
IH=3.84
FIG.14H
CHROMATIC ABERRATION OF MAGNIFICATION
IH=3.84
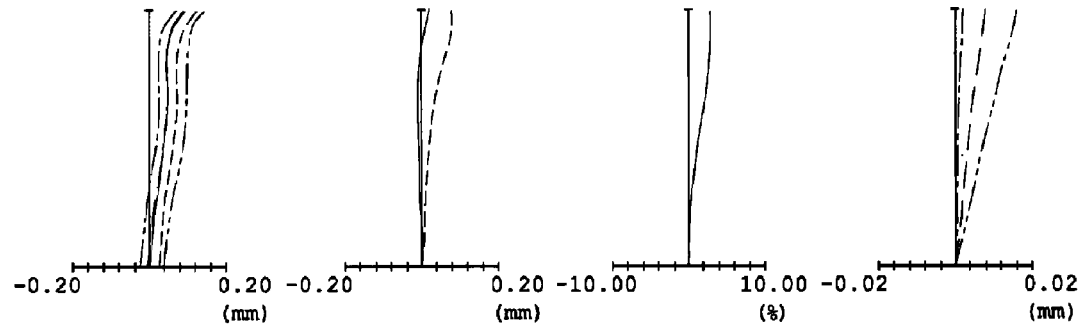
FIG.14I
SPHERICAL ABERRATION
FNO 4.944
FIG.14J
ASTIGMATISM
IH=3.84
FIG.14K
DISTORTION
IH=3.84
FIG.14L
CHROMATIC ABERRATION OF MAGNIFICATION
IH=3.84
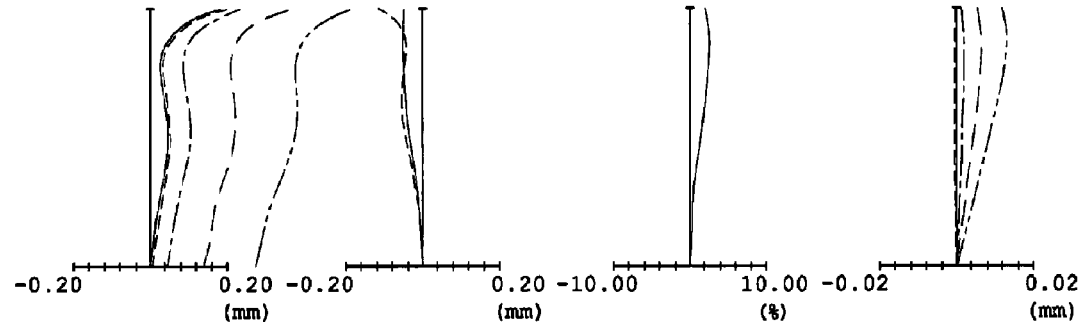
404.66 — — —  486.13 — · · —  587.56 ———
435.84 — — — —  656.27 — — — — —

ZOOM OPTICAL SYSTEM AND ELECTRONIC IMAGING APPARATUS USING THE SAME

This application claims benefits of Japanese Application No. 2006-316192 filed in Japan on Nov. 22, 2006, the contents of which are incorporated herein by reference.

BACKGROUND OF THE INVENTION

1. Field of the Invention

This invention relates to an electronic imaging apparatus having a zoom optical system which is peculiarly suitable for an electronic imaging optical system, has a large aperture, and is excellent in imaging performance.

2. Description of Related Art

Digital cameras have reached levels of practical use in high pixel density (high image quality) and small-sized and slim designs. As a result, the digital cameras have replaced silver-halide 35 mm cameras with respect to their functions and markets. The next performance requirement is that an object can be clearly photographed even in surroundings in which the amount of light is small. Hence, it is imperatively needed that high imaging performance and small thickness that have been attained so far in optical systems are left as they are and a large aperture ratio is designed.

As a conventional zoom optical system suitable for the design of the large aperture ratio, for example, a positive refracting power lead type zoom optical system has been known. This positive refracting power lead type zoom optical system includes, in order from the object side, a first lens unit with positive refracting power, a second lens unit with negative refracting power, a third lens unit with positive refracting power, and a fourth lens unit with positive refracting power.

On the other hand, as a zoom optical system suitable for a slim design, for example, a negative refracting power lead type zoom optical system has been known. This negative refracting power lead type zoom optical system includes, in order from the object side, a first lens unit with negative refracting power, a second lens unit with positive refracting power, and a third lens unit with positive refracting power. In the negative refracting power lead type zoom optical system, the first lens unit is constructed with a plurality of lens components in order to correct aberration.

Also, some of the negative refracting power lead type zoom optical systems have the possibility of a slimmer design. In such an optical system, the first lens unit is constructed with only one lens component to adopt a remarkable arrangement in view of the slim design.

SUMMARY OF THE INVENTION

The electronic imaging apparatus having a zoom optical system according to the present invention comprises a zoom optical system in which the most object-side lens unit A includes one biconcave-shaped negative lens component, each of air-contact-surfaces of which is configured as an aspherical surface, and when the magnification of the zoom optical system is changed in the range from a wide-angle position to a telephoto position, the lens unit A is moved back and forth along the optical axis in such a way that the lens unit A is initially moved toward the image side, and an electronic imaging unit that has an electronic image sensor in the proximity of the imaging position of the zoom optical system so that an image formed through the zoom optical system is picked up by the electronic image sensor and image data picked up by the electronic image sensor are electrically processed and can be output as image data whose format is changed. In this case, in nearly infinite object point focusing, the zoom optical system satisfies the following condition:

$$0.7 < y_{07}/(fw \cdot \tan \omega_{07w}) < 0.94 \tag{4}$$

where $y_{07}$ is expressed by $y_{07}=0.7 y_{10}$ when $y_{10}$ denotes a distance from the center to a point farthest from the center (the maximum image height) within an effective imaging surface (an imageable surface) of the electronic image sensor, $\omega_{07w}$ is an angle made by a direction of an object point corresponding to an image point, connecting the center of the imaging surface at the wide-angle position and the position of the image height you, with the optical axis, and fw is the focal length of the entire system of the zoom optical system at the wide-angle position.

In the electronic imaging apparatus having the zoom optical system of the present invention, it is desirable that the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$.

In the electronic imaging apparatus having the zoom optical system of the present invention, it is desirable that the cemented lens component of the lens unit A includes, in order from the object side, the negative lens $L_{AN}$ and the positive lens $L_{AP}$.

In the electronic imaging apparatus having the zoom optical system of the present invention, it is desirable that when z is taken as the coordinate in the direction of the optical axis, h is taken as the coordinate normal to the optical axis, k represents a conic constant, $A_4$, $A_6$, $A_8$, and $A_{10}$ represent aspherical coefficients, R represents the radius of curvature of a spherical component on the optical axis, and the configuration of an aspherical surface is expressed by the following equation:

$$z = \frac{h^2}{R[1 + \{1-(1+k)h^2/R^2\}^{1/2}]} + A_4 h^4 + A_6 h^6 + A_8 h^8 + A_{10} h^{10} + \ldots \tag{5}$$

the zoom optical system satisfies the following condition:

$$0.1 \leq |z_{AR}(h) - z_{AC}(h)|/tp \leq 0.96 \tag{6}$$

where $z_{AC}$ is the shape of the cementation-side surface, according to Equation (5), of the positive lens $L_{AP}$; $z_{AR}$ is the shape of the air-contact-side surface, according to Equation (5), of the positive lens $L_{AP}$; h is expressed by h=0.7 fw when the focal length of the entire system of the zoom optical system at the wide-angle position is denoted by fw; tp is the thickness, measured along the optical axis, of the positive lens $L_{AP}$, and always z (0)=0.

In the electronic imaging apparatus having the zoom optical system of the present invention, it is desirable that when z is taken as the coordinate in the direction of the optical axis, h is taken as the coordinate normal to the optical axis, k represents a conic constant, $A_4$, $A_6$, $A_8$, and $A_{10}$ represent aspherical coefficients, R represents the radius of curvature of a spherical component on the optical axis, and the configuration of an aspherical surface is expressed by the following equation:

$$z = \frac{h^2}{R[1 + \{1-(1+k)h^2/R^2\}^{1/2}]} + A_4 h^4 + A_6 h^6 + A_8 h^8 + A_{10} h^{10} + \ldots \tag{5}$$

the zoom optical system satisfies the following conditions:

$$-50 \leq k_{AF} \leq 10 \tag{8}$$

$$-20 \leq k_{AR} \leq 20 \tag{9}$$

and further satisfies the following condition:

$$-8 \leq z_{AF}(h)/z_{AR}(h) \leq 2 \tag{10}$$

where $k_{AF}$ is a k value relative to the most object-side surface of the lens unit A and $k_{AR}$ is a k value relative to the most image-side surface of the lens unit A, each of which is the k value in Equation (5); $z_{AF}$ is the shape of the most object-side surface of the lens unit A; $z_{AR}$ is the shape of the most image-side surface of the lens unit A; and h is expressed by h=0.7 fw when the focal length of the entire system of the zoom optical system at the wide-angle position is denoted by fw.

In the electronic imaging apparatus having the zoom optical system of the present invention, it is desirable that the zoom optical system has a lens unit B adjacent to the lens unit A; a distance along the optical axis between the lens unit A and the lens unit B is varied for the purpose of changing the magnification; the negative lens component of the lens unit A includes a cemented lens of the positive lens $L_{AP}$ and the negative lens $L_{AN}$; and in an orthogonal coordinate system in which the axis of abscissas is taken as νdp and the axis of ordinates is taken as θgFp, when a straight line expressed by $$\theta gFp = \alpha p \times \nu dp + \beta p \text{ (where } \alpha p = -0.00163\text{)}$$

is set, νdp and θgFp of the positive lens $L_{AP}$ are contained in both the region defined by a straight line in the lower limit of Condition (11) described below and by a straight line in the upper limit of Condition (11) and the region defined by Condition (12) described below:

$$0.6400 < \beta p < 0.9000 \tag{11}$$

$$3 < \nu dp < 27 \tag{12}$$

where θgFp is a partial dispersion ratio (ng−nF)/(nF−nC) of the positive lens $L_{AP}$, νdp is an Abbe's number (nd−1)/(nF−nC) of the positive lens $L_{AP}$, nd is a refractive index relative to the d line, nC is a refractive index relative to the C line, nF is a refractive index relative to the F line, and ng is a refractive index relative to the g line.

In the electronic imaging apparatus having the zoom optical system of the present invention, it is desirable that in an orthogonal coordinate system in which the axis of abscissas is taken as νdp and the axis of ordinates is taken as θhgp, when a straight line expressed by $$\theta hgp = \alpha hgp \times \nu dp + \beta hgp \text{ (where } \alpha hgp = -0.00225\text{)}$$

is set, νdp and θhgp of the positive lens $L_{AP}$ are contained in both the region defined by a straight line in the lower limit of Condition (13) described below and by a straight line in the upper limit of Condition (13) and the region defined by Condition (12) described below.

$$0.5700 < \beta hgp < 0.9500 \tag{13}$$

$$3 < \nu dp < 27 \tag{12}$$

where θhgp is a partial dispersion ratio (nh−ng)/(nF−nC) of the positive lens $L_{AP}$, νdp is an Abbe's number (nd−1)/(nF−nC) of the positive lens $L_{AP}$, nd is a refractive index relative to the d line, nC is a refractive index relative to the C line, nF is a refractive index relative to the F line, ng is a refractive index relative to the g line, and nh is a refractive index relative to the b line.

In the electronic imaging apparatus having the zoom optical system of the present invention, it is desirable to satisfy the following condition:

$$0.08 \leq \theta gFp - \theta gFn \leq 0.50 \tag{14}$$

where θgFp is a partial dispersion ratio (ng−nF)/(nF−nC) of the positive lens $L_{AP}$, θgFn is a partial dispersion ratio (ng−nF)/(nF−nC) of the negative lens $L_{AN}$, nC is a refractive index relative to the C line, nF is a refractive index relative to the F line, and ng is a refractive index relative to the g line.

In the electronic imaging apparatus having the zoom optical system of the present invention, it is desirable to satisfy the following condition:

$$0.09 \leq \theta hgp - \theta hgn \leq 0.60 \tag{15}$$

where θhgp is a partial dispersion ratio (nh−ng)/(nF−nC) of the positive lens $L_{AP}$, θhgn is a partial dispersion ratio (nh−ng)/(nF−nC) of the negative lens $L_{AN}$, nC is a refractive index relative to the C line, nF is a refractive index relative to the F line, ng is a refractive index relative to the g line, and nh is a refractive index relative to the h line.

In the electronic imaging apparatus having the zoom optical system of the present invention, it is desirable to satisfy the following condition:

$$\nu dp - \nu dn \leq -30 \tag{16}$$

where νdp is an Abbe's number (nd−1)/(nF−nC) of the positive lens $L_{AP}$, νdn is an Abbe's number (nd−1)/(nF−nC) of the negative lens $L_{AN}$, nd is a refractive index relative to the d line, nC is a refractive index relative to the C line, and nF is a refractive index relative to the F line.

In the electronic imaging apparatus having the zoom optical system of the present invention, it is desirable that a cementing surface of the cemented lens component is configured as an aspherical surface.

In the electronic imaging apparatus having the zoom optical system of the present invention, it is desirable that the aspherical surface of the cementing surface of the cemented lens component has a convergence property stronger than in a spherical surface in going from the optical axis to the periphery.

In the electronic imaging apparatus having the zoom optical system of the present invention, it is desirable that the difference of the refractive index relative to the d line between the positive lens $L_{AP}$ and the negative lens $L_{AN}$ is 0.2 or less.

In the electronic imaging apparatus having the zoom optical system of the present invention, it is desirable that a refractive index ndp of the positive lens $L_{AP}$, relative to the d line, satisfies the following condition:

$$1.50 \leq ndp \leq 1.85 \tag{17}$$

In the electronic imaging apparatus having the zoom optical system of the present invention, it is desirable that the zoom optical system has a lens unit B adjacent to the lens unit A, and the lens unit B includes two lens components, a single lens component and a cemented lens component, or three lenses.

In the electronic imaging apparatus having the zoom optical system of the present invention, it is desirable that the zoom optical system has a lens unit B adjacent to the lens unit A and further has a negative lens unit C and a positive lens unit D in which a mutual spacing is variable, on the image side of the lens unit B.

In the electronic imaging apparatus having the zoom optical system of the present invention, it is desirable to satisfy the following condition:

$$0.2 \leq d_{CD}/fw \leq 1.2 \tag{18}$$

where $d_{CD}$ is spacing along the optical axis between the lens unit C and the lens unit D in infinite focusing at the wide-angle position and fw is the focal length of the entire system of the zoom optical system at the wide-angle position.

In the electronic imaging apparatus having the zoom optical system of the present invention, it is desirable that when the magnification is changed in the range from the wide-angle position to the telephoto position, the lens unit C and the lens unit D are moved together in such a way that a relative spacing is simply widened or the lens unit D approaches the image side.

In the electronic imaging apparatus having the zoom optical system of the present invention, it is desirable that the lens unit C and the lens unit D are moved while changing a mutual spacing in focusing.

In the electronic imaging apparatus having the zoom optical system of the present invention, it is desirable that spacing between the lens unit C and the lens unit D is narrowed as focusing is performed at a short distance in a state where the lens unit A and the lens unit B are fixed.

In the electronic imaging apparatus having the zoom optical system of the present invention, it is desirable that the lens unit C includes a negative lens alone and the lens unit D includes a positive lens alone.

In the electronic imaging apparatus having the zoom optical system of the present invention, it is desirable that the zoom optical system has a lens unit B adjacent to the lens unit A and further has a negative lens unit C and a positive lens unit D including a meniscus lens with a convex surface facing the image side in which a mutual spacing is variable, on the image side of the lens unit B.

When the first lens unit is constructed with only one lens component, astigmatism is liable to deteriorate. This constitutes an obstacle to the design of the large aperture ratio. According to the present invention, the occurrence of astigmatism is tolerated to some extent, and thus even when the first lens unit is constructed with only one lens component, astigmatism can be favorably corrected. As a result, in the electronic imaging apparatus having the zoom optical system, the zoom optical system of the large aperture ratio is obtained. Moreover, when the first lens unit is constructed with only one lens component, the length of a collapsible lens barrel can be reduced. Whereby, in the zoom optical system, the slim design and the large aperture ratio can be made compatible. Since distortion is corrected to such an extent that it is corrected by image processing, an image in which distortion is also favorably corrected is finally obtained.

These and other features and advantages of the present invention will become apparent from the following detailed description of the preferred embodiments when taken in conjunction with the accompanying drawings.

BRIEF DESCRIPTION OF THE DRAWINGS

FIGS. 4A-4D, 4E-4H, and 4I-4L are diagrams showing aberration characteristics at wide-angle, middle, and telephoto positions, respectively, in infinite object point focusing of the zoom optical system of FIGS. 3A-3C;

FIGS. 6A-6D, 6E-6H, and 6I-6L are diagrams showing aberration characteristics at wide-angle, middle, and telephoto positions, respectively, in infinite object point focusing of the zoom optical system of FIGS. 5A-5C;

FIGS. 8A-8D, 8E-8H, and 8I-8L are diagrams showing aberration characteristics at wide-angle, middle, and telephoto positions, respectively, in infinite object point focusing of the zoom optical system of FIGS. 7A-7C;

FIGS. 10A-10D, 10E-10H, and 10I-10L are diagrams showing aberration characteristics at wide-angle, middle, and telephoto positions, respectively, in infinite object point focusing of the zoom optical system of FIGS. 9A-9C;

FIGS. 12A-12D, 12E-12H, and 12I-12L are diagrams showing aberration characteristics at wide-angle, middle, and telephoto positions, respectively, in infinite object point focusing of the zoom optical system of FIGS. 11A-11C;

FIGS. 14A-14D, 14E-14H, and 14I-14L are diagrams showing aberration characteristics at wide-angle, middle, and telephoto positions, respectively, in infinite object point focusing of the zoom optical system of FIGS. 13A-13C;

DETAILED DESCRIPTION OF THE PREFERRED EMBODIMENTS

Figure 1A:
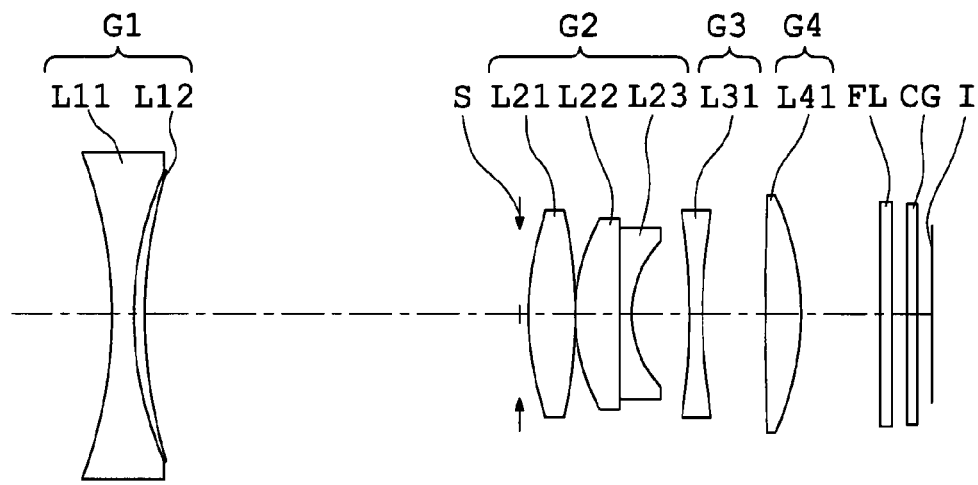
FIGS. 1A, 1B, and 1C are sectional views showing optical arrangements, developed along the optical axis, at wide-angle, middle, and telephoto positions, respectively, in infinite object point focusing of Embodiment 1 of the zoom optical system according to the present invention.

Before undertaking the description of the embodiments, the function and effect of the present invention will be explained.

The electronic imaging apparatus having a zoom optical system of the present invention comprises a zoom optical system in which the most object-side lens unit A includes one biconcave-shaped negative lens component, each of air-contact-surfaces of which is configured as an aspherical surface, and the lens unit A is moved back and forth along the optical axis in such a way that the lens unit A is initially moved toward the image side when the magnification of the zoom optical system is changed in the range from the wide-angle position to the telephoto position, and an electronic imaging unit that has an electronic image sensor in the proximity of the imaging position of the zoom optical system so that an image formed through the zoom optical system is picked up by the electronic image sensor and image data picked up by the electronic image sensor are electrically processed and can be output as image data whose format is changed. In this case, in nearly infinite object point focusing, the zoom optical system satisfies the following condition:

$$0.7 < y_{07}/(fw \cdot \tan \omega_{07w}) < 0.94 \quad (4)$$

where $y_{07}$ is expressed by $y_{07}=0.7y_{10}$ when $y_{10}$ denotes a distance from the center to a point farthest from the center (the maximum image height) within an effective imaging surface (an imageable surface) of the electronic image sensor, $\omega_{07w}$ is an angle made by a direction of an object point corresponding to an image point, connecting the center of the imaging surface at the wide-angle position and the position of the image height $y_{07}$, with the optical axis, and fw is the focal length of the entire system of the zoom optical system at the wide-angle position. Also, the center is a point of intersection of the optical axis of the zoom optical system with the imaging surface.

Here, reference is made to the background that Condition (4) is set.

It is assumed that an infinite object is imaged by an optical system free of distortion. In this case, the formed image is free from distortion and thus the following equation is established:

$$f = y/\tan \omega \quad (2)$$

where y is the height of an image point from the optical axis, f is the focal length of an imaging system, and $\omega$ is an angle made by the direction of an object point corresponding to the image point connected to the position of the height y from the center of the imaging surface with the optical axis.

On the other hand, in the optical system, when barrel distortion is tolerated only in the proximity of the wide-angle position, the following condition is obtained:

$$f > y/\tan \omega \quad (3)$$

That is, when the angle $\omega$ and the height y are set to constant values, the focal length f at the wide-angle position may remain long and correction for aberration, notably for astigmatism, is facilitated accordingly. Although a lens unit corresponding to the lens unit A is usually constructed with at least two lens components, the reason for this lies in the fact that corrections for distortion and astigmatism are made compatible. In contrast to this, in the zoom optical system of the present invention, the occurrence of distortion is tolerated to some extent. That is, since it is not necessary that corrections for distortion and astigmatism are made compatible, astigmatism is easier corrected.

In the electronic imaging apparatus having the zoom optical system of the present invention, the occurrence of distortion is tolerated to some extent. Thus, the present invention is such that image data obtained by the electronic image sensor are processed by the image processing. In this processing, the image data (the image shape) are changed so that barrel distortion is corrected. By doing so, the image data finally obtained provide a shape very similar to the object. Hence, it is only necessary to output the image of the object into a CRT and a printer in accordance with the image data.

Here, it is favorable to adopt the zoom optical system so as to satisfy the following condition in nearly infinite object point focusing:

$$0.7 < y_{07}/(fw \cdot \tan \omega_{07w}) < 0.94 \quad (4)$$

where $y_{07}$ is expressed by $y_{07}=0.7y_{10}$ when $y_{10}$ denotes a distance from the center to a point farthest from the center (the maximum image height) within an effective imaging surface (an imageable surface) of the electronic image sensor, $\omega_{07w}$ is an angle made by a direction of an object point corresponding to an image point, connecting the center of the imaging surface at the wide-angle position and the position of the image height $y_{07}$, with the optical axis, and fw is the focal length of the entire system of the zoom optical system at the wide-angle position.

Condition (4) determines the extent of barrel distortion at the zoom wide-angle position. When Condition (4) is satisfied, astigmatism can be reasonably corrected even when the optical system is designed for the large aperture ratio. Also, a barrel-distorted image is photoelectrically converted by the image sensor into barrel-distorted image data. However, in the barrel-distorted image data, a process corresponding to a change of the image shape is electrically applied by an image processing means that is the signal processing system of the electronic imaging apparatus. By doing so, even when the image data finally output from the image processing means are reproduced by a display device, an image that is corrected for distortion and is very similar in shape to the object is obtained.

Here, beyond the upper limit of Condition (4), notably in a value close to 1, distortion is optically well corrected. On the other hand, however, correction for astigmatism becomes difficult, which is unfavorable.

Below the lower limit of Condition (4), the proportion of enlargement of the image periphery in the radial direction is extremely increased when image distortion due to distortion of the optical system is corrected by the image processing means. As a result, the degradation of sharpness of the image periphery becomes pronounced.

When Condition (4) is satisfied, favorable correction for astigmatism is facilitated and the design of the large aperture ratio (for example, brightness below F/2.8 at the wide-angle position) of the zoom optical system becomes possible. Moreover, since the first lens unit is constructed with one lens component, the slim design of the zoom optical system is also compatible with the large aperture ratio.

Instead of satisfying Condition (4), it is more favorable to satisfy the following condition:

$$0.75 < y_{07}/(fw \cdot \tan \omega_{07w}) < 0.93 \quad (4')$$

Further, instead of satisfying Condition (4), it is much more favorable to satisfy the following condition:

$$0.80 < y_{07}/(fw \cdot \tan \omega_{07w}) < 0.92 \quad (4'')$$

In the zoom optical system, it is rather desirable that the lens unit A is constructed with the cemented lens component in which the positive lens $L_{AP}$ and the negative lens $L_{AN}$ are cemented. By using this cemented lens component, chromatic aberration and astigmatism in the design of the large aperture ratio can be completely corrected.

In particular, as the optical material of the positive lens $L_{AP}$, it is desirable to use an organic material such as resin, for example, energy curing resin. When such an optical material is used, it is possible to work (configure) as thin the positive lens $L_{AP}$ as possible. Specifically, the energy curing resin is used as the optical material of the positive lens $L_{AP}$ so that it is configured directly on the negative lens $L_{AN}$. By doing so, the thickness of the positive lens $L_{AP}$ can be reduced. As the energy curing resin, for example, ultraviolet curing resin is available.

In this case, from the viewpoint of durability of the resin, it is rather desirable that the cemented lens component of the lens unit A includes, in order from the object side, the negative lens $L_{AN}$ and the positive lens $L_{AP}$.

It is desirable that a lens shape is taken as described below. When z is taken as the coordinate in the direction of the optical axis, h is taken as the coordinate normal to the optical axis, k represents a conic constant, $A_4$, $A_6$, $A_8$, and $A_{10}$ represent aspherical coefficients, and R represents the radius of curvature of a spherical component on the optical axis, the configuration of an aspherical surface is expressed by the following equation:

$$z = \frac{h^2}{R[1+\{1-(1+k)h^2/R^2\}^{1/2}]} + A_4 h^4 + A_6 h^6 + A_8 h^8 + A_{10} h^{10} + \ldots \quad (5)$$

In this case, it is desirable to satisfy the following condition:

$$0.1 \leq |z_{AR}(h) - z_{AC}(h)|/tp \leq 0.96 \quad (6)$$

where $z_{AC}$ is the shape of the cementation-side surface of the positive lens $L_{AP}$ and $z_{AR}$ is the shape of the air-contact-side surface of the positive lens $L_{AP}$, both according to Condition (5); h is expressed by h=0.7 fw when the focal length of the entire system of the zoom optical system at the wide-angle position is denoted by fw; and tp is the thickness, measured along the optical axis, of the positive lens $L_{AP}$. Also, always z(0)=0.

Below the lower limit of Condition (6), correction for chromatic aberration is liable to become insufficient. On the other hand, beyond the upper limit of Condition (6), it becomes difficult to ensure a peripheral edge thickness of the positive lens $L_{AP}$. Specifically, when the thickness of the positive lens $L_{AP}$ is made small, it is necessary to ensure the peripheral edge thickness by a preset amount, but it becomes difficult to ensure this preset amount of edge thickness.

Instead of satisfying Condition (6), it is more desirable to satisfy the following condition:

$$0.3 \leq |z_{AR}(h) - z_{AC}(h)|/tp \leq 0.94 \quad (6')$$

Further, instead of satisfying Condition (6), it is most desirable to satisfy the following condition:

$$0.5 \leq |z_{AR}(h) - z_{AC}(h)|/tp \leq 0.92 \quad (6'')$$

When the thickness, measured along the optical axis, of the negative lens $L_{AN}$ of the lens unit A is denoted by tn, it is favorable to satisfy the following condition:

$$0.3 \leq tp/tn \leq 1.3 \quad (7)$$

Alternatively, when shapes of the most object-side surface and the most image-side surface of the lens unit A are considered as described below, astigmatism can be effectively corrected.

That is, when the configuration of the aspherical surface is expressed by Equation (5), it is desirable to satisfy the following conditions:

$$-50 \leq k_{AF} \leq 10 \quad (8)$$

$$-20 \leq k_{AR} \leq 20 \quad (9)$$

and to further satisfy the following condition:

$$-8 \leq z_{AF}(h)/z_{AR}(h) \leq 2 \quad (10)$$

where $k_{AF}$ is a k value relative to the most object-side surface of the lens unit A and $k_{AR}$ is a k value relative to the most image-side surface of the lens unit A, each of which is the k value in Equation (5); $z_{AF}$ is the shape of the most object-side surface of the lens unit A; $z_{AR}$ is the shape of the most image-side surface of the lens unit A; and h is expressed by h=0.7 fw when the focal length of the entire system of the zoom optical system at the wide-angle position is denoted by fw.

Beyond the upper limit of Condition (10), this is liable to become disadvantageous to correction for astigmatism. On the other hand, below the lower limit of Condition (10), the amount of occurrence of distortion is materially increased. Hence, even though an image processing function to be described later is used to correct distortion, an image periphery is enlarged radially (in a direction from the image center toward the periphery) by this correction. As a consequence, the resolution of a peripheral portion in a meridional direction is liable to be impaired.

Instead of satisfying Condition (10), it is more desirable to satisfy the following condition:

$$-4 \leq z_{AF}(h)/z_{AR}(h) \leq 0 \quad (10')$$

Further, instead of satisfying Condition (10), it is most desirable to satisfy the following condition:

$$-2 \leq z_{AF}(h)/z_{AR}(h) \leq -0.3 \quad (10'')$$

In the design of the large aperture ratio of the zoom optical system, as mentioned above, the present invention is constructed to consider correction for astigmatism. However, it is also necessary to render correction for chromatic aberration severe with increasing aperture ratio. As such, it is favorable that the positive lens $L_{AP}$ (the optical material used for the positive lens $L_{AP}$) of the lens unit A satisfies conditions described below. That is, in an orthogonal coordinate system in which the axis of abscissas is taken as vdp and the axis of ordinates is taken as θgFp, it is desirable that when a straight line expressed by θgFp=αp×vdp+βp (where αp=−0.00163)

is set, vdp and θgFp of the positive lens $L_{AP}$ are contained in both the region defined by a straight line in the lower limit of Condition (11) described below and by a straight line in the upper limit of Condition (11) and the region defined by Condition (12) described below.

$$0.6400 < \beta p < 0.9000 \quad (11)$$

$$3 < vdp < 27 \quad (12)$$

where θgFp is a partial dispersion ratio (ng−nF)/(nF−nC) of the positive lens $L_{AP}$, vdp is an Abbe's number (nd−1)/(nF−nC) of the positive lens $L_{AP}$, nd is a refractive index relative to the d line, nC is a refractive index relative to the C line, nF is a refractive index relative to the F line, and ng is a refractive index relative to the g line.

Below the lower limit of Condition (11), chromatic aberration due to the secondary spectrum, namely chromatic aberration of the g line in the case of achromatism at the F line and the C line, is not completely corrected when the optical system is designed for the large aperture ratio. Consequently, when the object is photographed by the optical system, it is difficult to ensure sharpness of the image of the photographed object. On the other hand, beyond the upper limit of Condition (11), chromatic aberration due to the secondary spectrum is overcorrected when the optical system is designed for the large aperture ratio. Consequently, like the case of "below the lower limit of Condition (11)", it is difficult to ensure sharpness of the image of the photographed object. Below the lower limit of Condition (12) or beyond the upper limit of Condition (12), achromatism itself at the F line and the C line is difficult and the fluctuation of chromatic aberration in zooming is increased, when the optical system is designed for the large aperture ratio. Hence, when the object is photographed by the optical system, it is difficult to ensure sharpness of the image of the photographed object.

Instead of satisfying Condition (11), it is more favorable to satisfy the following condition:

$$0.6800 < \beta p < 0.8700 \qquad (11')$$

Further, instead of satisfying Condition (11), it is much more favorable to satisfy the following condition:

$$0.6900 < \beta p < 0.8200 \qquad (11'')$$

In an orthogonal coordinate system in which the axis of abscissas is taken as νdp and the axis of ordinates is taken as θhgp, it is desirable that when a straight line expressed by $$\theta hgp = \alpha hgp \times \nu dp + \beta hgp \text{ (where } \alpha hgp = -0.00225\text{)}$$

is set, νdp and θhgp of the positive lens $L_{AP}$ are contained in both the region defined by a straight line in the lower limit of Condition (13) described below and by a straight line in the upper limit of Condition (13) and the region defined by Condition (12) described below.

$$0.5700 < \beta hgp < 0.9500 \qquad (13)$$

$$3 < \nu dp < 27 \qquad (12)$$

where θhgp is a partial dispersion ratio (nh−ng)/(nF−nC) of the positive lens $L_{AP}$, νdp is an Abbe's number (nd−1)/(nF−nC) of the positive lens $L_{AP}$, nd is a refractive index relative to the d line, nC is a refractive index relative to the C line, nF is a refractive index relative to the F line, ng is a refractive index relative to the g line, and nh is a refractive index relative to the h line.

Below the lower limit of Condition (13), chromatic aberration due to the secondary spectrum, namely chromatic aberration of the h line in the case of achromatism at the F line and the C line, is not completely corrected when the optical system is designed for the large aperture ratio. Consequently, when the object is photographed by the optical system, purple flare and color blurring are liable to occur in the image of the photographed object. On the other hand, beyond the upper limit of Condition (13), chromatic aberration due to the secondary spectrum, namely chromatic aberration of the h line in the case of achromatism at the F line and the C line, is overcorrected when the optical system is designed for the large aperture ratio. Consequently, when the object is photographed by the optical system, purple flare and color blurring are liable to occur in the image of the photographed object.

Instead of satisfying Condition (13), it is more favorable to satisfy the following condition:

$$0.6200 < \beta hgp < 0.9200 \qquad (13')$$

Further, instead of satisfying Condition (13), it is much more favorable to satisfy the following condition:

$$0.6500 < \beta hgp < 0.8700 \qquad (13'')$$

In the zoom optical system of the present invention, when the optical system satisfies a condition described below, correction efficiency relative to the secondary spectrum is raised where the optical system is designed for the large aperture ratio. Consequently, the sharpness of the image of the photographed object is increased.

$$0.08 \leq \theta gFp - \theta gFn \leq 0.50 \qquad (14)$$

where θgFp is a partial dispersion ratio (ng−nF)/(nF−nC) of the positive lens $L_{AP}$, θgFn is a partial dispersion ratio (ng−nF)/(nF−nC) of the negative lens $L_{AN}$, nC is a refractive index relative to the C line, nF is a refractive index relative to the F line, and ng is a refractive index relative to the g line.

Instead of satisfying Condition (14), it is more desirable to satisfy the following condition:

$$0.10 \leq \theta gFp - \theta gFn \leq 0.40 \qquad (14')$$

Further, instead of satisfying Condition (14), it is most desirable to satisfy the following condition:

$$0.12 \leq \theta gFp - \theta gFn \leq 0.30 \qquad (14'')$$

In the zoom optical system, it is desirable to satisfy a condition described below. In this case, color flare and blurring can be lessened in the image of the photographed object.

$$0.09 \leq \theta hgp - \theta hgn \leq 0.60 \qquad (15)$$

where θhgp is a partial dispersion ratio (nh−ng)/(nF−nC) of the positive lens $L_{AP}$, θhgn is a partial dispersion ratio (nh−ng)/(nF−nC) of the negative lens $L_{AN}$, nC is a refractive index relative to the C line, nF is a refractive index relative to the F line, ng is a refractive index relative to the g line, and nh is a refractive index relative to the h line.

Instead of satisfying Condition (15), it is more desirable to satisfy the following condition:

$$0.12 \leq \theta hgp - \theta hgn \leq 0.50 \qquad (15')$$

Further, instead of satisfying Condition (15), it is most desirable to satisfy the following condition:

$$0.15 \leq \theta hgp - \theta hgn \leq 0.40 \qquad (15'')$$

In the zoom optical system, achromatism at the C line and the F line of longitudinal chromatic aberration and chromatic aberration of magnification is facilitated when the optical system satisfies the following condition:

$$\nu dp - \nu dn \leq -30 \qquad (16)$$

where νdp is an Abbe's number (nd−1)/(nF−nC) of the positive lens $L_{AP}$, νdn is an Abbe's number (nd−1)/(nF−nC) of the negative lens $L_{AN}$, nd is a refractive index relative to the d line, nC is a refractive index relative to the C line, and nF is a refractive index relative to the F line.

Instead of satisfying Condition (16), it is more desirable to satisfy the following condition:

$$\nu dp - \nu dn \leq -40 \qquad (16')$$

Further, instead of satisfying Condition (16), it is most desirable to satisfy the following condition:

$$\nu dp - \nu dn \leq -50 \qquad (16'')$$

It is also desirable that the cementing surface of the cemented lens component is configured as an aspherical surface. The purpose of constructing the lens unit A with the cemented lens component is to correct chromatic aberration. However, with only Conditions (11)-(16) for chromatic aberration of the positive lens $L_{AP}$ and the negative lens $L_{AN}$ constituting the cemented lens component, chromatic aberration is sometimes not completely corrected. In this case, when the cementing surface is configured as the aspherical surface, this is effective for correcting chromatic aberration.

Generally, in the zoom lens, simultaneous correction for chromatic aberrations of magnification at telephoto and wide-angle positions becomes difficult as the lens arrangement is simplified. Thus, when the cementing surface of the most object-side lens unit is configured as the aspherical surface, chromatic aberration of magnification can be controlled only at the wide-angle position, and therefore the simultaneous correction is facilitated.

It is also desirable that the aspherical surface of the cementing surface of the cemented lens component has a convergence property stronger than in a spherical surface in going from the optical axis to the periphery. When an attempt is made to decrease the thickness of the most object-side lens unit and to simplify the lens arrangement, there is a tendency that chromatic aberration of magnification at the wide-angle position is liable to be undercorrected, compared with that at the telephoto position. As such, the cementing surface of the most object-side lens unit is configured as the aspherical surface that the convergence property becomes strong in going from the optical axis to the periphery, and thereby the problem of undercorrection at the wide-angle position can be solved. As a consequence, chromatic aberration of magnification can be favorably corrected over the entire zoom region.

It is desirable that the difference of the refractive index relative to the d line between the positive lens $L_{AP}$ and the negative lens $L_{AN}$ is 0.2 or less. This is the condition set so that when chromatic aberration of magnification at the wide-angle position is corrected, other aberrations are not degraded. Beyond this value, coma and astigmatism are liable to be degraded. It is more desirable that the difference of the refractive index is 0.14 or less. It is much more desirable that the difference of the refractive index is 0.065 or less.

When the lens unit A is constructed with one lens component, this is liable to become more disadvantageous to correction for astigmatism than the case where the lens unit A is constructed with a plurality of lens components. Thus, in the zoom optical system, when a refractive index ndp relative to the d line of the positive lens $L_{AP}$ (the optical material used for the positive lens $L_{AP}$) of the lens unit A satisfies the following condition, this is advantageous to correction for astigmatism.

$$1.50 \leq ndp \leq 1.85 \quad (17)$$

Below the lower limit of Condition (17), astigmatism is not completely corrected. On the other hand, beyond the upper limit of Condition (17), coma is not completely corrected.

Instead of satisfying Condition (17), it is more desirable to satisfy the following condition:

$$1.55 \leq ndp \leq 1.80 \quad (17')$$

Further, instead of satisfying Condition (17), it is most desirable to satisfy the following condition:

$$1.57 \leq ndp \leq 1.77 \quad (17'')$$

Also, although it is difficult that optical glass satisfying Conditions (11) and (12) is available, there is the possibility of easily realizing any organic material such as resin, or any material that inorganic microscopic particles are diffused in such an organic material and thereby its optical property is changed.

Also, in the zoom optical system, it is favorable that when the magnification is change in the range from the wide-angle position to the telephoto position, the lens unit A is moved back and forth along the optical axis in such a way that it is initially moved toward the image side. This causes the overall length of the optical system to be reduced and is effective for the slim design where the lens barrel is collapsed.

Also, in the case where the optical system is designed for the large aperture ratio, for example, where the F value of the optical system is made smaller than F/2.8, astigmatism is liable to occur when the lens unit A is constructed with only one lens component. Hence, it is desirable that astigmatism is previously corrected by the lens units other than the lens unit A.

Thus, in the zoom optical system, in order to favorably correct chromatic aberration and astigmatism, the lens unit B is constructed with two lens components, a single lens component and a cemented lens component, or three lenses. Here, it is desirable that the lens unit B has positive refracting power and includes, in order from the object side, a single positive lens component B1 and a cemented lens component B2 of a positive lens and a negative lens. Alternatively, it is desirable that the lens unit B has positive refracting power and includes, in order from the object side, the single positive lens component B1 and the cemented lens component B2 of a positive lens, a negative lens, and a negative lens.

In such an arrangement, it is desirable that an average value $_{AVE}nd_{2p}$ of refractive indices (relative to the d line) of all positive lenses in the lens component B1 and the lens component B2 is 1.81 or more. By doing so, astigmatism can be favorably corrected. If the average value $_{AVE}nd_{2p}$ is below 1.81, it becomes difficult that astigmatism is favorably corrected.

It is also desirable that, from the viewpoint of chromatic aberration, an average value $_{AVE}vd_{2N}$ of Abbe's numbers (relative to the d line) of all negative lenses in the lens component B1 and the lens component B2 is 25 or less (and preferably 10 or more).

Alternatively, in the zoom optical system, it is desirable that two lenses, the negative lens unit C and the positive lens unit D, in which a mutual spacing is variable are arranged on the image side of the lens unit B. By doing so, even when the large aperture ratio (for example, brightness below F/2.8) is obtained at the wide-angle position, it becomes possible to correct astigmatism at an adequate level in the entire region of zooming and focusing. It is particularly desirable that when the magnification is changed in the range from the wide-angle position to the telephoto position, the lens unit C and the lens unit D are moved while simply widening the relative spacing. Alternatively, it is desirable that the is lens unit C and the lens unit D are moved together so that the lens unit D approaches an imaging point. Whereby, the fluctuation of astigmatism at the wide-angle position or in the magnification change can be suppressed.

It is desirable that a spacing $d_{CD}$ between the lens unit C and the lens unit D on the optical axis in infinite focusing at a wide-angle position satisfies the following condition:

$$0.2 \leq d_{CD}/fw \leq 1.2 \quad (18)$$

where fw is the focal length of the entire system of the zoom optical system at the wide-angle position.

Below the lower limit of Condition (18), it becomes particularly difficult to favorably correct astigmatism at the wide-angle position. Alternatively, it becomes difficult to lower a sensitivity to decetration in each of the lens units C and D. On the other hand, beyond the upper limit of Condition (18), it becomes difficult to reduce the length of the lens barrel when collapsed.

Instead of satisfying Condition (18), it is more favorable to satisfy the following condition:

$$0.25 \leq d_{CD}/fw \leq 0.9 \quad (18')$$

Further, instead of satisfying Condition (18), it is most favorable to satisfy the following condition:

$$0.3 \leq d_{CD}/fw \leq 0.6 \quad (18'')$$

It is also desirable that, in focusing, the lens unit C and the lens unit D are moved while changing the mutual spacing. By doing so, the fluctuation of astigmatism due to focusing can be kept to a minimum. In particular, it is desirable that the lens unit C and the lens unit D are moved so as to narrow the mutual spacing as focusing is performed at a short distance in a state where the lens unit A and the lens unit B are fixed. Whereby, the fluctuation of astigmatism due to focusing can be kept to a minimum.

In general, one lens unit is placed on the image side of the lens unit B, whereas in the present invention, two lens units are arranged. Therefore, the thickness where the lens barrel is collapsed is increased for one lens unit. Thus, in order to check an increase in thickness as far as possible, it is desirable to take account of the following description:

a. the lens unit C is constructed with a negative lens alone and the lens unit D is constructed with a positive lens alone, and b. the lens unit C and the lens unit D are designed to satisfy the following conditions:

$$-1.5 \leq (R_{CF}+R_{CR})/(R_{CF}-R_{CR}) \leq 1.5 \quad (19)$$

$$0.0 \leq (R_{DF}+R_{DR})/(R_{DF}-R_{DR}) \leq 1.5 \quad (20)$$

where $R_{CF}$ and $R_{DF}$ are radii of curvature of the most object-side surfaces of the lens units C and D, respectively, and $R_{CR}$ and $R_{DR}$ are radii of curvature of the most image-side surfaces of the lens units C and D, respectively.

By doing so, dead space between the lens unit B, the lens unit C, and the lens unit D when the lens barrel is collapsed can be kept to a minimum.

Instead of satisfying Conditions (19) and (20), it is more desirable to satisfy the following conditions:

$$-1.2 \leq (R_{CF}+R_{CR})/(R_{CF}-R_{CR}) \leq 1.2 \quad (19')$$

$$0.3 \leq (R_{DF}+R_{DR})/(R_{DF}-R_{DR}) \leq 1.2 \quad (20')$$

Further, instead of satisfying Conditions (19) and (20), it is most desirable to satisfy the following conditions:

$$-1.0 \leq (R_{CF}+R_{CR})/(R_{CF}-R_{CR}) \leq 1.0 \quad (19'')$$

$$0.6 \leq (R_{DF}+R_{DR})/(R_{DF}-R_{DR}) \leq 1.0 \quad (20'')$$

In this case, it is favorable that a refractive index $nd_{4p}$ of the lens unit D relative to the d line is 1.7 or more and an Abbe's number $vd_{4p}$ relative to the d line ranges from 20 to 50.

The positive lens unit C and the lens unit D including a meniscus lens with a convex surface facing the image side in which the mutual spacing is variable may be arranged on the image side. When the refracting power of the lens unit C is positive, the meniscus lens with the convex surface facing the image side is placed in the lens unit D and thereby curvature of field can be well corrected. Also, the meniscus lens with the convex surface facing the image side may be configured as a negative lens or a positive lens because the difference between radii of curvature of two surfaces is small. In this case, it is desirable that the lens unit C is constructed with the positive lens alone.

In accordance with the drawings, the embodiments of the zoom optical system used in the electronic imaging apparatus of the present invention will be explained below. The zoom optical system used in the electronic imaging apparatus of the present invention comprises four lens units. Of these lens units, a first lens unit includes two lenses (a cemented doublet), a second lens unit includes three lenses (a single lens and a cemented doublet), a third lens unit includes one lens, and a fourth lens unit includes one lens. Also, the second lens unit may include four lenses (a single lens and a cemented triplet).

The refracting power of one lens can be imparted to two lenses. In this case, although this is not described in the embodiments, one lens can be added to at least one of the four lens units. In an extreme case, the first lens unit includes three lenses, the second lens unit includes five lenses, the third lens unit includes two lenses, and the fourth lens unit includes two lenses. Also, two lenses may be configured as a cemented lens or separate single lenses (for example, the first lens unit can be constructed with a cemented doublet and a single lens or with a cemented triplet).

As mentioned above, the zoom optical system is capable of providing the first lens unit with two or three lenses, the second lens unit with three to five lenses, the third lenses with one or two lenses, and the fourth lens unit with one or two lenses. Since one lens is added and thereby the number of lenses used for correcting aberration is increased, the design of the large aperture ratio is facilitated in a state where aberration is favorably corrected. Moreover, the radius of curvature of each of two lenses can be increased, and hence the thickness of each lens is not so large. As such, the optical system is not oversized.

Embodiment 1

Figure 1B:
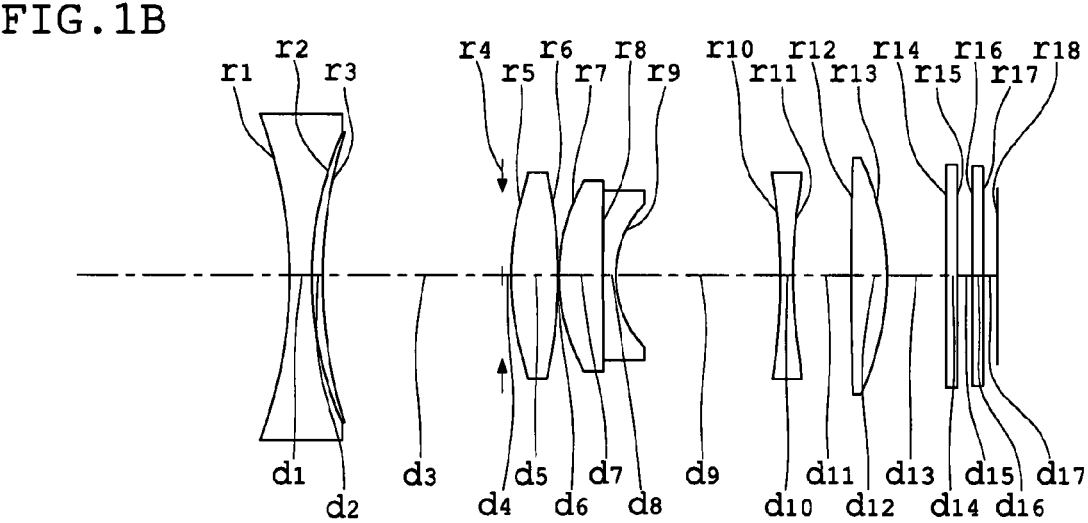
Figure 1C:
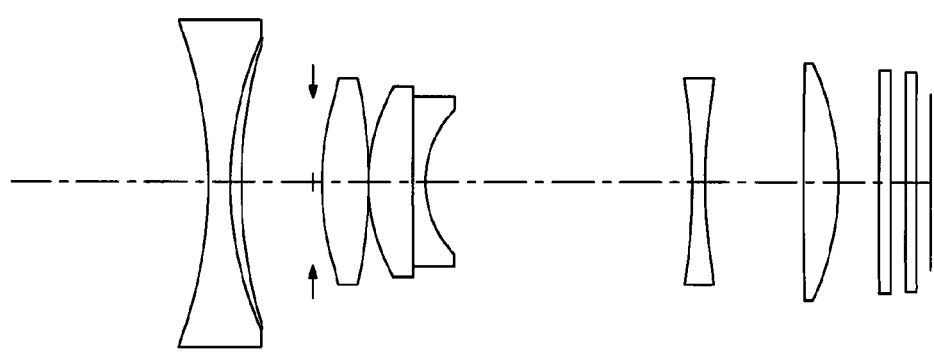
Figure 2A:
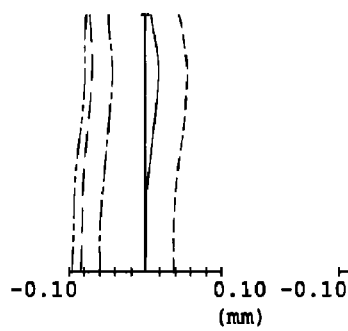
FIGS. 2A-2D, 2E-2H, and 2I-2L are diagrams showing aberration characteristics at wide-angle, middle, and telephoto positions, respectively, in infinite object point focusing of the zoom optical system of FIGS. 1A-1C.
Figure 2B:
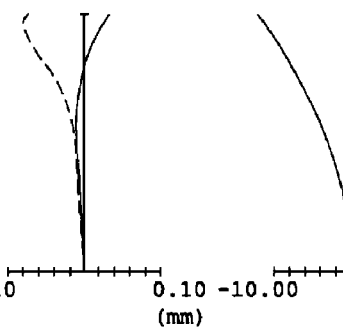
Figure 2C:
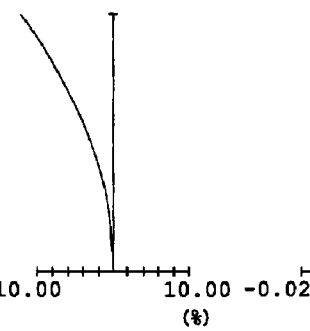
Figure 2D:
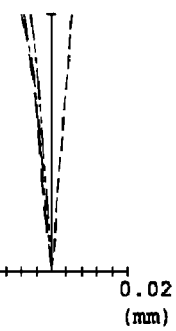
Figure 2E:
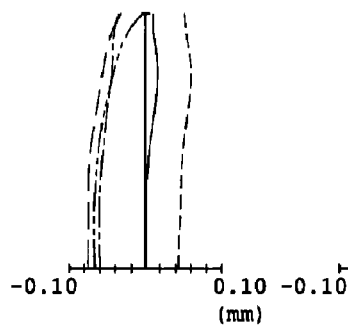
Figure 2F:
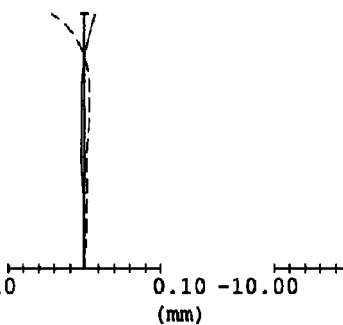
Figure 2G:
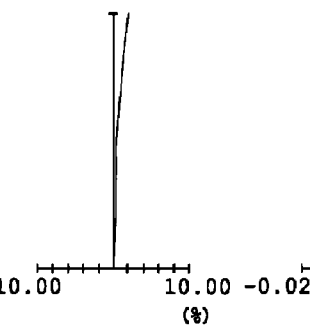
Figure 2H:
Figure 2I:
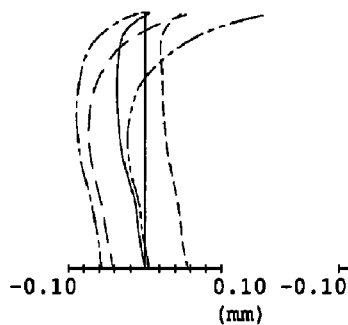
Figure 2J:
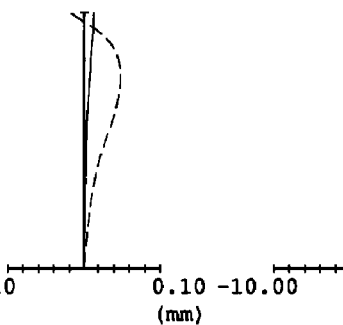
Figure 2K:
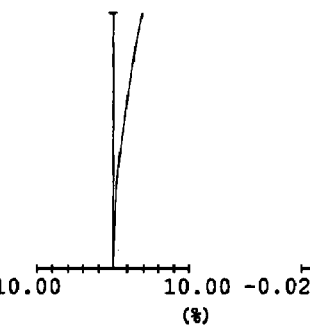
Figure 2L:
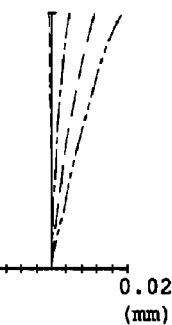

FIGS. 1A, 1B, and 1C are sectional views showing optical arrangements, developed along the optical axis, at wide-angle, middle, and telephoto positions, respectively, in infinite object point focusing of Embodiment 1 of the zoom optical system according to the present invention. FIGS. 2A-2D, 2E-2H, and 2I-2L are diagrams showing aberration characteristics at wide-angle, middle, and telephoto positions, respectively, in infinite object point focusing of the zoom optical system of FIGS. 1A-1C. In FIG. 1A, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 1 has the lens units, the filter FL, and the cover glass CG. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1, after being initially moved toward the image side, is moved toward the object side. The second lens unit G2 is simply moved, together with the aperture stop S, along the optical axis toward the object side so that spacing between the first lens unit G1 and the second lens unit G2 is narrowed.

The third lens unit G3 is moved back and forth along the optical axis in such a way that the third lens unit G3 is initially moved toward the image side to narrow the spacing between the third lens unit G3 and the fourth lens unit G4 and then is moved toward the object side. The fourth lens unit G4 is simply moved along the optical axis toward the image side.

Subsequently, numerical data of optical members constituting the zoom optical system of Embodiment 1 are shown below. In the numerical data of Embodiment 1, $r_1$, $r_2$, . . . denote radii of curvature of surfaces of individual lenses; $d_1$, $d_2$, . . . denote thicknesses of individual lenses or air spacings between them; $n_{d1}$, $n_{d2}$, . . . denote refractive indices of individual lenses at the d line; $v_{d1}$, $v_{d2}$, . . . denote Abbe's numbers of individual lenses; F denotes the focal length of the entire system of the zoom optical system; and fno denotes the F-number of the zoom optical system.

Also, when z is taken as the coordinate in the direction of the optical axis, h is taken as the coordinate normal to the optical axis, k represents a conic constant, $A_4, A_6, A_8$, and $A_{10}$ represent aspherical coefficients, and R represents the radius of curvature of a spherical component on the optical axis, the configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (5)$$

These symbols are also used for the numerical data of other embodiments to be described later.

Numerical data 1

| | | | |
|---|---|---|---|
| $r_1 = -13.2566$ (aspherical surface) | $d_1 = 0.8000$ | $n_{d1} = 1.49700$ | $\nu_{d1} = 81.54$ |
| $r_2 = 13.1877$ | $d_2 = 0.4237$ | $n_{d2} = 1.63494$ | $\nu_{d2} = 23.22$ |
| $r_3 = 20.8972$ (aspherical surface) | $d_3 = D3$ | | |
| $r_4 = \infty$ (stop) | $d_4 = 0.3000$ | | |
| $r_5 = 8.6234$ (aspherical surface) | $d_5 = 1.8201$ | $n_{d5} = 1.83481$ | $\nu_{d5} = 42.71$ |
| $r_6 = -28.1231$ (aspherical surface) | $d_6 = 0.0791$ | | |
| $r_7 = 7.0624$ (aspherical surface) | $d_7 = 1.7619$ | $n_{d7} = 1.83481$ | $\nu_{d7} = 42.71$ |
| $r_8 = -462.1726$ | $d_8 = 0.4000$ | $n_{d8} = 1.80810$ | $\nu_{d8} = 24.00$ |
| $r_9 = 3.9333$ | $d_9 = D9$ | | |
| $r_{10} = -34.2928$ (aspherical surface) | $d_{10} = 0.5000$ | $n_{d10} = 1.52542$ | $\nu_{d10} = 55.78$ |
| $r_{11} = 22.6658$ | $d_{11} = D11$ | | |
| $r_{12} = 63.7715$ (aspherical surface) | $d_{12} = 1.3800$ | $n_{d12} = 1.83481$ | $\nu_{d12} = 42.71$ |
| $r_{13} = -9.6000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (imaging surface) | | | |

Aspherical coefficients

First surface $k = -2.8817$
$A_2 = 0$  $A_4 = 0$  $A_6 = 3.6881 \times 10^{-6}$  $A_8 = -5.5124 \times 10^{-8}$
$A_{10} = 0$

Third surface $k = -2.9323$
$A_2 = 0$  $A_4 = 3.6856 \times 10^{-5}$  $A_6 = 5.0066 \times 10^{-6}$  $A_8 = -5.9251 \times 10^{-8}$
$A_{10} = 0$

Fifth surface $k = -1.8270$
$A_2 = 0$  $A_4 = -3.4535 \times 10^{-4}$  $A_6 = -2.1823 \times 10^{-5}$  $A_8 = -7.8527 \times 10^{-8}$
$A_{10} = 0$

Sixth surface $k = -5.3587$
$A_2 = 0$  $A_4 = -3.7600 \times 10^{-4}$  $A_6 = -4.8554 \times 10^{-6}$  $A_8 = -2.1415 \times 10^{-7}$
$A_{10} = 0$

Seventh surface $k = 0.1274$
$A_2 = 0$  $A_4 = 8.3040 \times 10^{-5}$  $A_6 = 1.9928 \times 10^{-5}$  $A_8 = 5.0707 \times 10^{-7}$
$A_{10} = 8.1677 \times 10^{-9}$

Tenth surface $k = 57.7596$
$A_2 = 0$  $A_4 = -1.7412 \times 10^{-4}$  $A_6 = -4.6146 \times 10^{-6}$  $A_8 = 1.1872 \times 10^{-6}$
$A_{10} = 0$

Twelfth surface $k = 0$
$A_2 = 0$  $A_4 = -4.1049 \times 10^{-4}$  $A_6 = 3.1634 \times 10^{-6}$  $A_8 = 0$
$A_{10} = 0$

Refractive indices classified by wavelengths in medium constituting negative lens $L_{AN}$

| | | | | |
|---|---|---|---|---|
| nd = 1.496999 | nC = 1.495136 | nF = 1.501231 | ng = 1.504507 | nh = 1.507205 |

Refractive indices classified by wavelengths in medium constituting positive lens $L_{AP}$

| | | | | |
|---|---|---|---|---|
| nd = 1.634937 | nC = 1.627308 | nF = 1.654649 | ng = 1.673790 | nh = 1.692286 |

-continued

Numerical data 1

Zoom data (when D0 (distance from object to first surface) is infinite)

|  | Wide-angle | Middle | Telephoto |
|---|---|---|---|
| F | 6.42002 | 11.01031 | 18.48954 |
| fno | 1.8604 | 2.4534 | 3.4040 |
| D0 | ∞ | ∞ | ∞ |
| D3 | 14.77955 | 7.26463 | 2.92947 |
| D9 | 2.20000 | 6.46215 | 10.54460 |
| D11 | 2.38783 | 2.27230 | 3.76136 |
| D13 | 3.16783 | 2.30230 | 1.60000 |
| D17 | 0.50018 | 0.50009 | 0.50003 |

Embodiment 2

Figure 3A:
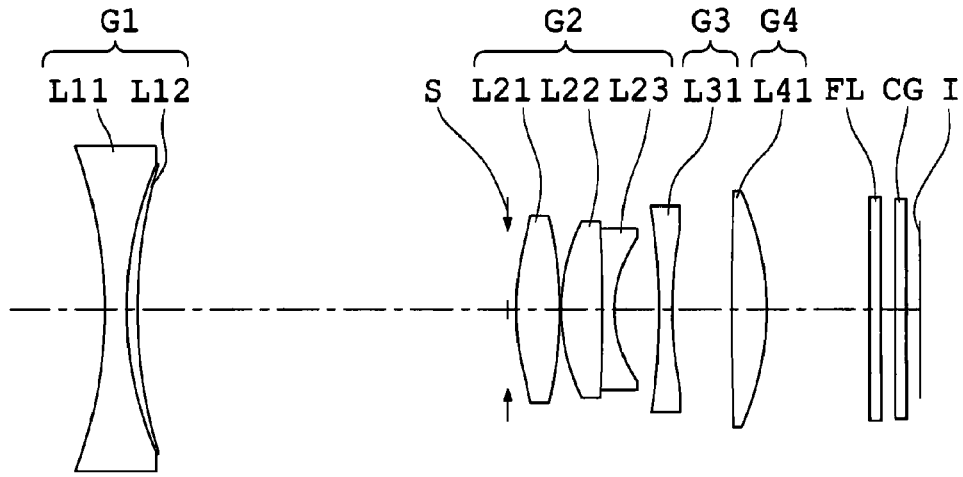
FIGS. 3A, 3B, and 3C are sectional views showing optical arrangements, developed along the optical axis, at wide-angle, middle, and telephoto positions, respectively, in infinite object point focusing of Embodiment 2 of the zoom optical system according to the present invention.
Figure 3B:
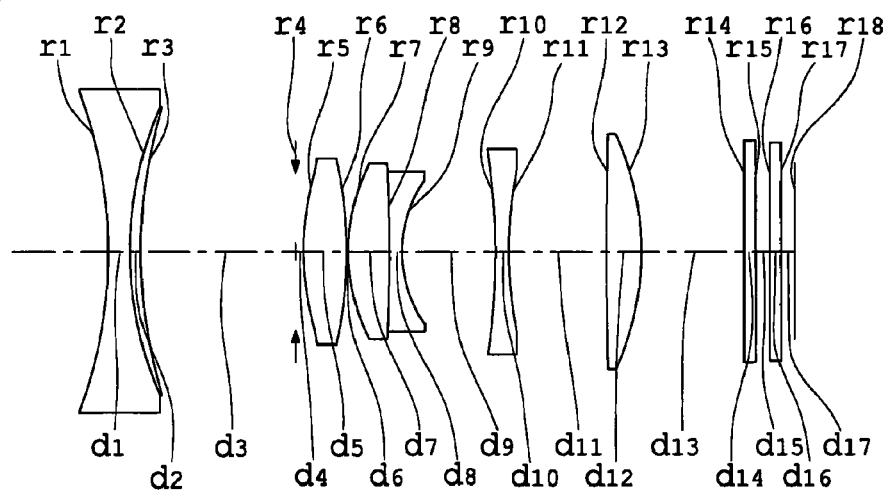
Figure 3C:
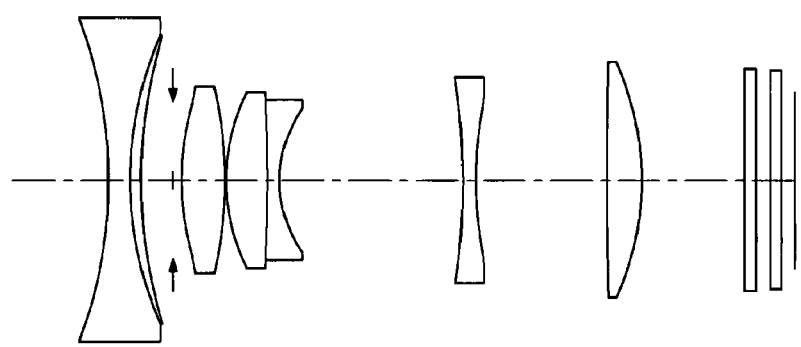

FIGS. 3A, 3B, and 3C are sectional views showing optical arrangements, developed along the optical axis, at wide-angle, middle, and telephoto positions, respectively, in infinite object point focusing of Embodiment 2 of the zoom optical system according to the present invention. FIGS. 4A-4D, 4E-4H, and 4I-4L are diagrams showing aberration characteristics at wide-angle, middle, and telephoto positions, respectively, in infinite object point focusing of the zoom optical system of FIGS. 3A-3C. In FIG. 3A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 2 has the lens units, the filter FL, and the cover glass CG. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1, after being initially moved toward the image side, is moved toward the object side. The second lens unit G2 is simply moved, together with the aperture stop S, along the optical axis toward the object side so that spacing between the first lens unit G1 and the second lens unit G2 is narrowed. The third lens unit G3 is simply moved along the optical axis toward the object side so that the spacing between the lens unit 3 and the lens unit 4 is widened, and the fourth lens unit G4 is moved back and forth along the optical axis in such a way that the fourth lens unit G4 is initially moved toward the object side and then is moved toward the image side.

Subsequently, numerical data of optical members constituting the zoom optical system of Embodiment 2 are shown below.

Numerical data 2

| | | | |
|---|---|---|---|
| $r_1 = -14.6626$ (aspherical surface) | $d_1 = 0.8000$ | $n_{d1} = 1.58313$ | $v_{d1} = 59.38$ |
| $r_2 = 13.6376$ | $d_2 = 0.3515$ | $n_{d2} = 1.70999$ | $v_{d2} = 15.00$ |
| $r_3 = 23.8797$ (aspherical surface) | $d_3 = D3$ | | |
| $r_4 = \infty$ (stop) | $d_4 = 0.3000$ | | |
| $r_5 = 8.4853$ (aspherical surface) | $d_5 = 1.7330$ | $n_{d5} = 1.83481$ | $v_{d5} = 42.71$ |
| $r_6 = -18.3330$ (aspherical surface) | $d_6 = 0.0791$ | | |
| $r_7 = 8.2088$ (aspherical surface) | $d_7 = 1.5797$ | $n_{d7} = 1.83481$ | $v_{d7} = 42.71$ |
| $r_8 = -63.5592$ | $d_8 = 0.4000$ | $n_{d8} = 1.80810$ | $v_{d8} = 23.00$ |
| $r_9 = 4.3771$ | $d_9 = D9$ | | |
| $r_{10} = -53.5288$ (aspherical surface) | $d_{10} = 0.5000$ | $n_{d10} = 1.85628$ | $v_{d10} = 20.67$ |
| $r_{11} = 15.5000$ | $d_{11} = D11$ | | |
| $r_{12} = 108.2217$ (aspherical surface) | $d_{12} = 1.3800$ | $n_{d12} = 1.90000$ | $v_{d12} = 27.00$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (imaging surface) | | | |

Aspherical coefficients first surface $k = -10.2252$
$A_2 = 0$   $A_4 = 0$   $A_6 = 3.2236 \times 10^{-6}$   $A_8 = -5.3588 \times 10^{-8}$
$A_{10} = 0$ -continued Numerical data 2

Third surface $k = 3.8529$
$A_2 = 0$          $A_4 = 1.8071 \times 10^{-4}$     $A_6 = 3.8543 \times 10^{-6}$     $A_8 = -6.1982 \times 10^{-8}$
$A_{10} = 0$ Fifth surface $k = -2.4081$
$A_2 = 0$          $A_4 = -4.2584 \times 10^{-4}$    $A_6 = -2.8865 \times 10^{-5}$    $A_8 = -1.0370 \times 10^{-6}$
$A_{10} = 0$ Sixth surface $k = -5.4692$
$A_2 = 0$          $A_4 = -4.0486 \times 10^{-4}$    $A_6 = -1.6488 \times 10^{-5}$    $A_8 = -6.8729 \times 10^{-7}$
$A_{10} = 0$ Seventh surface $k = 0.3254$
$A_2 = 0$          $A_4 = 1.8098 \times 10^{-4}$     $A_6 = 1.9304 \times 10^{-5}$     $A_8 = 5.1165 \times 10^{-7}$
$A_{10} = 4.3288 \times 10^{-8}$ Tenth surface $k = 0$
$A_2 = 0$          $A_4 = -3.6619 \times 10^{-4}$    $A_6 = -1.7580 \times 10^{-5}$    $A_8 = -1.2817 \times 10^{-7}$
$A_{10} = 0$ Twelfth surface $k = 0$
$A_2 = 0$          $A_4 = -2.5932 \times 10^{-4}$    $A_6 = 4.3267 \times 10^{-6}$     $A_8 = 0$
$A_{10} = 0$ Refractive indices classified by wavelengths in medium constituting negative lens $L_{AN}$ nd = 1.583126     nC = 1.580139    nF = 1.589960    ng = 1.595297    nh = 1.599721

Refractive indices classified by wavelengths in medium constituting positive lens $L_{AP}$ nd = 1.709995     nC = 1.697485    nF = 1.744813    ng = 1.781729    nh = 1.820349

Zoom data (when D0 (distance from object to first surface) is infinite)

|     | Wide-angle | Middle   | Telephoto |
| --- | ---------- | -------- | --------- |
| F   | 6.41984    | 11.01046 | 18.48745  |
| fno | 2.1308     | 2.6883   | 3.5779    |
| D0  | ∞          | ∞        | ∞         |
| D3  | 14.77590   | 6.40215  | 1.62729   |
| D9  | 1.77131    | 3.83488  | 7.44342   |
| D11 | 2.34515    | 3.70635  | 5.10940   |
| D13 | 3.98433    | 4.12060  | 4.02033   |
| D17 | 0.49902    | 0.50111  | 0.50375   |

Embodiment 3

Figure 5A:
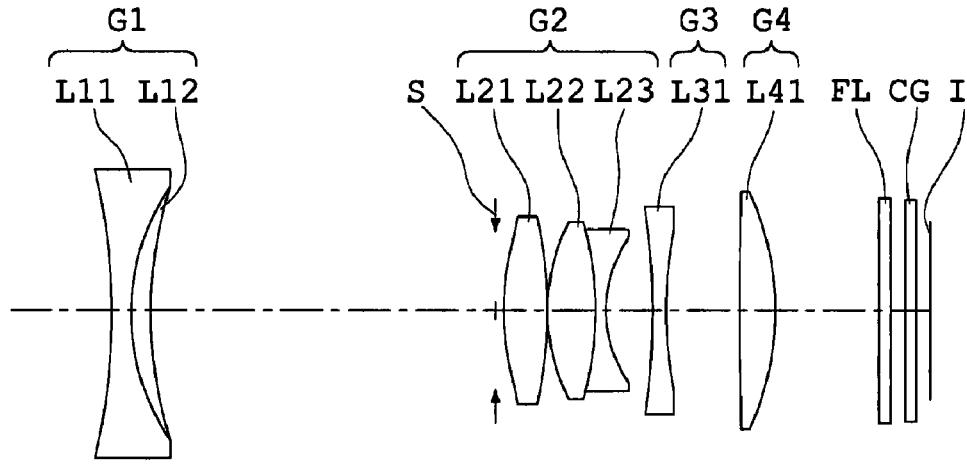
FIGS. 5A, 5B, and 5C are sectional views showing optical arrangements, developed along the optical axis, at wide-angle, middle, and telephoto positions, respectively, in infinite object point focusing of Embodiment 3 of the zoom optical system according to the present invention.
Figure 5B:
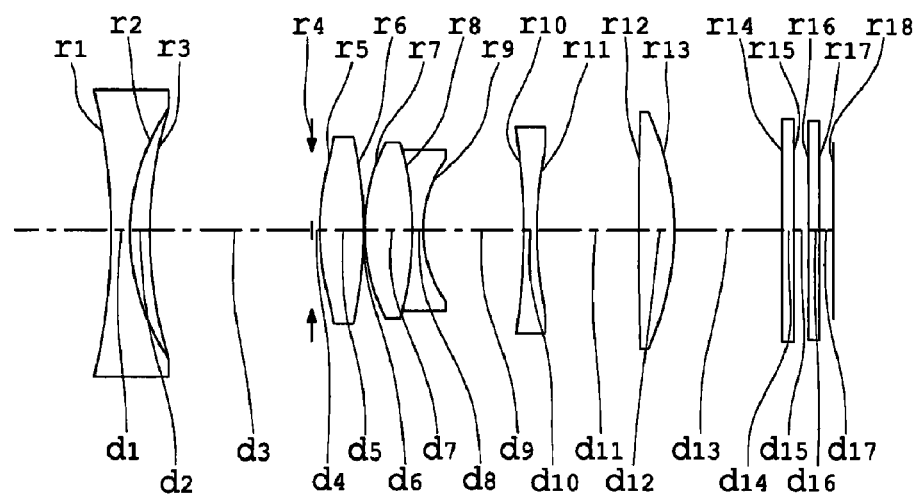
Figure 5C:
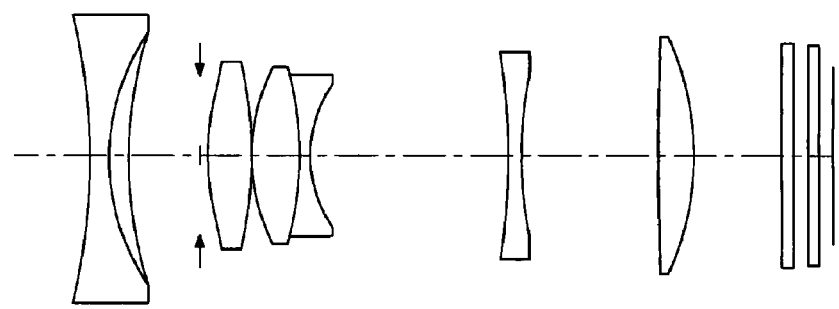

FIGS. 5A, 5B, and 5C are sectional views showing optical arrangements, developed along the optical axis, at wide-angle, middle, and telephoto positions, respectively, in infinite object point focusing of Embodiment 3 of the zoom optical system according to the present invention. FIGS. 6A-6D, 6E-6H, and 6I-6L are diagrams showing aberration characteristics at wide-angle, middle, and telephoto positions, respectively, in infinite object point focusing of the zoom optical system of FIGS. 5A-5C. In FIG. 5A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 3 has the lens units, the filter FL, and the cover glass CG. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1 is initially moved toward the image side and then is moved toward the object side. The second lens unit G2 is simply moved, together with the aperture stop S, along the optical axis toward the object side so that spacing between the first lens unit G1 and the second lens unit G2 is narrowed. The third lens unit G3 is simply moved along the optical axis toward the object side so that the spacing between the third lens unit G3 and the fourth lens unit G4 is widened. The fourth lens unit G4 is moved back and forth along the optical axis in such a way that the fourth lens unit G4 is initially moved toward the object side and then is moved toward the image side.

Subsequently, numerical data of optical members constituting the zoom optical system of Embodiment 3 are shown below.

Numerical data 3

| | | | |
|---|---|---|---|
| $r_1 = -25.4905$ (aspherical surface) | $d_1 = 0.8000$ | $n_{d1} = 1.74320$ | $v_{d1} = 49.34$ |
| $r_2 = 8.2460$ | $d_2 = 0.6848$ | $n_{d2} = 1.75000$ | $v_{d2} = 15.00$ |
| $r_3 = 15.7873$ (aspherical surface) | $d_3 = D3$ | | |
| $r_4 = \infty$ (stop) | $d_4 = 0.3000$ | | |
| $r_5 = 7.8777$ (aspherical surface) | $d_5 = 1.8441$ | $n_{d5} = 1.83481$ | $v_{d5} = 42.71$ |
| $r_6 = -15.9558$ (aspherical surface) | $d_6 = 0.0791$ | | |
| $r_7 = 9.3650$ (aspherical surface) | $d_7 = 1.7013$ | $n_{d7} = 1.83481$ | $v_{d7} = 42.71$ |
| $r_8 = -14.1273$ | $d_8 = 0.4000$ | $n_{d8} = 1.80810$ | $v_{d8} = 22.76$ |
| $r_9 = 4.5576$ | $d_9 = D9$ | | |
| $r_{10} = -37.4717$ (aspherical surface) | $d_{10} = 0.5000$ | $n_{d10} = 2.00000$ | $v_{d10} = 25.00$ |
| $r_{11} = 15.5000$ | $d_{11} = D11$ | | |
| $r_{12} = 103.2252$ (aspherical surface) | $d_{12} = 1.3800$ | $n_{d12} = 1.92000$ | $v_{d12} = 22.00$ |
| $r_{13} = -9.6000$ | $d_{13} = D13$ | | |
| $r_{14} = \infty$ | $d_{14} = 0.5000$ | $n_{d14} = 1.54771$ | $v_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $v_{d16} = 64.14$ |
| $r_{17} = \infty$ | $d_{17} = D17$ | | |
| $r_{18} = \infty$ (imaging surface) | | | |

Aspherical coefficients

First surface $k = 0.6227$
$A_2 = 0$   $A_4 = 0$   $A_6 = 3.3561 \times 10^{-6}$   $A_8 = -1.5540 \times 10^{-9}$
$A_{10} = 0$

Third surface $k = -0.5547$
$A_2 = 0$   $A_4 = -9.9336 \times 10^{-6}$   $A_6 = 6.6953 \times 10^{-6}$   $A_8 = 9.6741 \times 10^{-8}$
$A_{10} = 0$

Fifth surface $k = -1.8589$
$A_2 = 0$   $A_4 = -3.2115 \times 10^{-4}$   $A_6 = -2.1569 \times 10^{-5}$   $A_8 = -9.0860 \times 10^{-7}$
$A_{10} = 0$

Sixth surface $k = -8.6329$
$A_2 = 0$   $A_4 = -3.5000 \times 10^{-4}$   $A_6 = -9.1033 \times 10^{-6}$   $A_8 = -7.6128 \times 10^{-7}$
$A_{10} = 0$

Seventh surface $k = 0.1074$
$A_2 = 0$   $A_4 = 1.4490 \times 10^{-4}$   $A_6 = 1.5895 \times 10^{-5}$   $A_8 = 7.9815 \times 10^{-7}$
$A_{10} = 4.1284 \times 10^{-9}$

Tenth surface $k = 0$
$A_2 = 0$   $A_4 = -4.3432 \times 10^{-4}$   $A_6 = -3.9156 \times 10^{-5}$   $A_8 = 1.3010 \times 10^{-6}$
$A_{10} = 0$

Twelfth surface $k = 0$
$A_2 = 0$   $A_4 = -2.1377 \times 10^{-4}$   $A_6 = 2.2393 \times 10^{-6}$   $A_8 = 0$
$A_{10} = 0$

Refractive indices classified by wavelengths in medium constituting negative lens $L_{AN}$ nd = 1.743198   nC = 1.738653   nF = 1.753716   ng = 1.762047   nh = 1.769040

Refractive indices classified by wavelengths in medium constituting positive lens $L_{AP}$ nd = 1.749995   nC = 1.736707   nF = 1.786700   ng = 1.822303   nh = 1.857180

Zoom data (when D0 (distance from object to first surface) is infinite)

| | Wide-angle | Middle | Telephoto |
|---|---|---|---|
| F | 6.41996 | 11.01015 | 18.48954 |
| fno | 2.3074 | 2.9164 | 3.9965 |
| D0 | ∞ | ∞ | ∞ |

-continued

Numerical data 3

| | | | |
|---|---|---|---|
| D3 | 13.62838 | 6.55176 | 2.97274 |
| D9 | 1.84065 | 4.01071 | 7.85352 |
| D11 | 2.85247 | 3.85195 | 5.22392 |
| D13 | 3.98922 | 4.31057 | 3.46097 |
| D17 | 0.50005 | 0.49998 | 0.49996 |

Embodiment 4

Figure 7A:
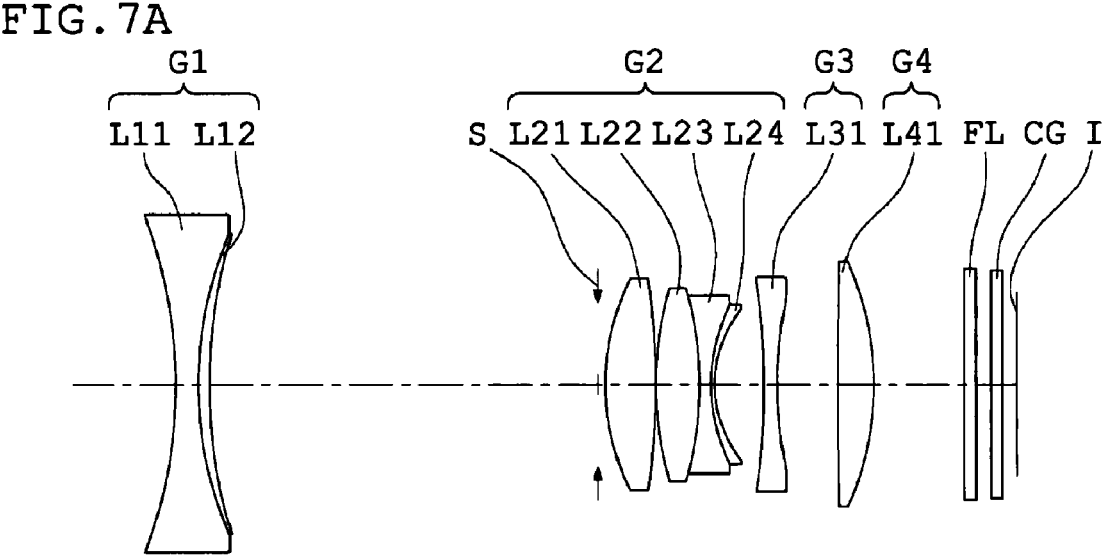
FIGS. 7A, 7B, and 7C are sectional views showing optical arrangements, developed along the optical axis, at wide-angle, middle, and telephoto positions, respectively, in infinite object point focusing of Embodiment 4 of the zoom optical system according to the present invention.
Figure 7B:
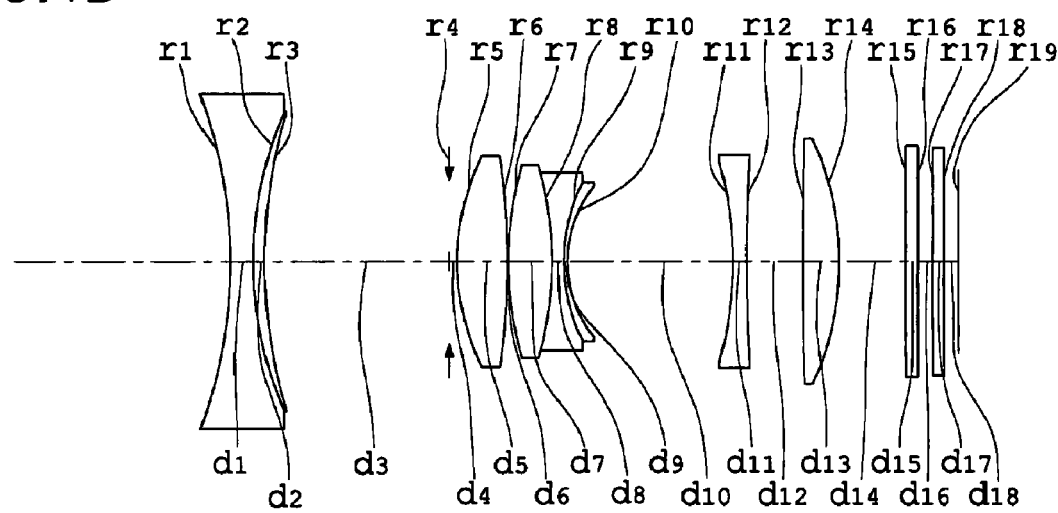
Figure 7C:
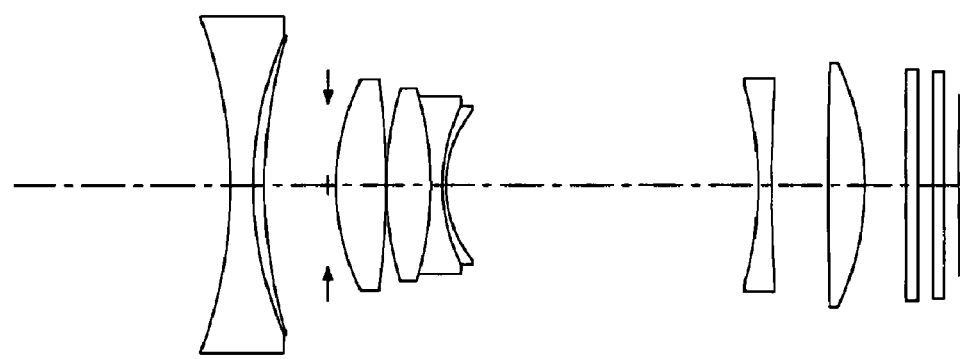

FIGS. 7A, 7B, and 7C are sectional views showing optical arrangements, developed along the optical axis, at wide-angle, middle, and telephoto positions, respectively, in infinite object point focusing of Embodiment 4 of the zoom optical system according to the present invention. FIGS. 8A-8D, 8E-8H, and 8I-8L are diagrams showing aberration characteristics at wide-angle, middle, and telephoto positions, respectively, in infinite object point focusing of the zoom optical system of FIGS. 7A-7C. In FIG. 7A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 4 has the lens units, the filter FL, and the cover glass CG. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22, a biconcave lens L23, and a negative meniscus lens L24 with a convex surface facing the object side are cemented. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1 is initially moved toward the image side and then is moved toward the object side. The second lens unit G2 is simply moved, together with the aperture stop S, along the optical axis toward the object side so that spacing between the first lens unit G1 and the second lens unit G2 is narrowed. The third lens unit G3 is simply moved toward the image side, and the fourth lens unit G4 is simply moved toward the image side so that the spacing between the third lens unit G3 and the fourth lens unit G4 is kept constant.

Subsequently, numerical data of optical members constituting the zoom optical system of Embodiment 4 are shown below.

Numerical data 4

| | | | |
|---|---|---|---|
| $r_1 = -12.4638$ (aspherical surface) | $d_1 = 0.8000$ | $n_{d1} = 1.49700$ | $v_{d1} = 81.54$ |
| $r_2 = 13.3687$ | $d_2 = 0.4776$ | $n_{d2} = 1.63494$ | $v_{d2} = 23.22$ |
| $r_3 = 27.4986$ (aspherical surface) | $d_3 = D3$ | | |
| $r_4 = \infty$ (stop) | $d_4 = 0.3000$ | | |
| $r_5 = 7.4744$ (aspherical surface) | $d_5 = 1.9063$ | $n_{d5} = 1.83481$ | $v_{d5} = 42.71$ |
| $r_6 = -21.4110$ (aspherical surface) | $d_6 = 0.0791$ | | |
| $r_7 = 11.1522$ (aspherical surface) | $d_7 = 1.7145$ | $n_{d7} = 1.81600$ | $v_{d7} = 46.62$ |
| $r_8 = -11.6979$ | $d_8 = 0.4000$ | $n_{d8} = 1.76182$ | $v_{d8} = 26.52$ |
| $r_9 = 6.0000$ | $d_9 = 0.1000$ | $n_{d9} = 1.63494$ | $v_{d9} = 23.22$ |
| $r_{10} = 3.7931$ (aspherical surface) | $d_{10} = D10$ | | |
| $r_{11} = -18.5300$ (aspherical surface) | $d_{11} = 0.5000$ | $n_{d11} = 1.49700$ | $v_{d11} = 81.54$ |
| $r_{12} = 43.8425$ | $d_{12} = D12$ | | |
| $r_{13} = 49.7881$ (aspherical surface) | $d_{13} = 1.5213$ | $n_{d13} = 1.83481$ | $v_{d13} = 42.71$ |
| $r_{14} = -9.3000$ | $d_{14} = D14$ | | |
| $r_{15} = \infty$ | $d_{15} = 0.5000$ | $n_{d15} = 1.54771$ | $v_{d15} = 62.84$ |
| $r_{16} = \infty$ | $d_{16} = 0.5000$ | | |
| $r_{17} = \infty$ | $d_{17} = 0.5000$ | $n_{d17} = 1.51633$ | $v_{d17} = 64.14$ |
| $r_{18} = \infty$ | $d_{18} = D18$ | | |
| $r_{19} = \infty$ (imaging surface) | | | |

Aspherical coefficients

First surface $k = -6.4093$
$A_2 = 0$   $A_4 = 0$   $A_6 = 1.6769 \times 10^{-6}$   $A_8 = -2.3120 \times 10^{-8}$
$A_{10} = 0$ Third surface $k = -2.4919$
$A_2 = 0$   $A_4 = 1.9423 \times 10^{-4}$   $A_6 = 1.8515 \times 10^{-6}$   $A_8 = -3.3639 \times 10^{-8}$
$A_{10} = 0$ -continued Numerical data 4

Fifth surface k = −0.9686
$A_2 = 0$         $A_4 = -3.9412 \times 10^{-5}$    $A_6 = 0$         $A_8 = 0$
$A_{10} = 0$ Sixth surface k = −70.1334
$A_2 = 0$         $A_4 = 1.1578 \times 10^{-5}$    $A_6 = 0$         $A_8 = 0$
$A_{10} = 0$ Tenth surface k = 0
$A_2 = 0$         $A_4 = -2.1909 \times 10^{-3}$    $A_6 = 8.0659 \times 10^{-5}$    $A_8 = -9.4134 \times 10^{-6}$
$A_{10} = 0$ Eleventh surface k = 0
$A_2 = 0$         $A_4 = -5.4322 \times 10^{-4}$    $A_6 = 1.0884 \times 10^{-5}$    $A_8 = 0$
$A_{10} = 0$ Thirteenth surface k = 0
$A_2 = 0$         $A_4 = -3.4682 \times 10^{-4}$    $A_6 = 0$         $A_8 = 0$
$A_{10} = 0$ Refractive indices classified by wavelengths in medium constituting negative lens $L_{AN}$ nd = 1.496999    nC = 1.495136    nF = 1.501231    ng = 1.504507    nh = 1.507205

Refractive indices classified by wavelengths in medium constituting positive lens $L_{AP}$ nd = 1.634940    nC = 1.627290    nF = 1.654640    ng = 1.672913    nh = 1.689873

Zoom data (when D0 (distance from object to first surface) is infinite)

|     | Wide-angle | Middle   | Telephoto |
|-----|------------|----------|-----------|
| F   | 6.42002    | 11.01030 | 18.48960  |
| fno | 1.8487     | 2.4557   | 3.3920    |
| D0  | ∞          | ∞        | ∞         |
| D3  | 14.82390   | 7.08722  | 2.38201   |
| D10 | 1.92800    | 6.27359  | 11.86067  |
| D12 | 2.07054    | 2.07054  | 2.07054   |
| D14 | 3.37860    | 2.55161  | 1.60000   |
| D18 | 0.50009    | 0.50001  | 0.49964   |

Embodiment 5

Figure 9A:
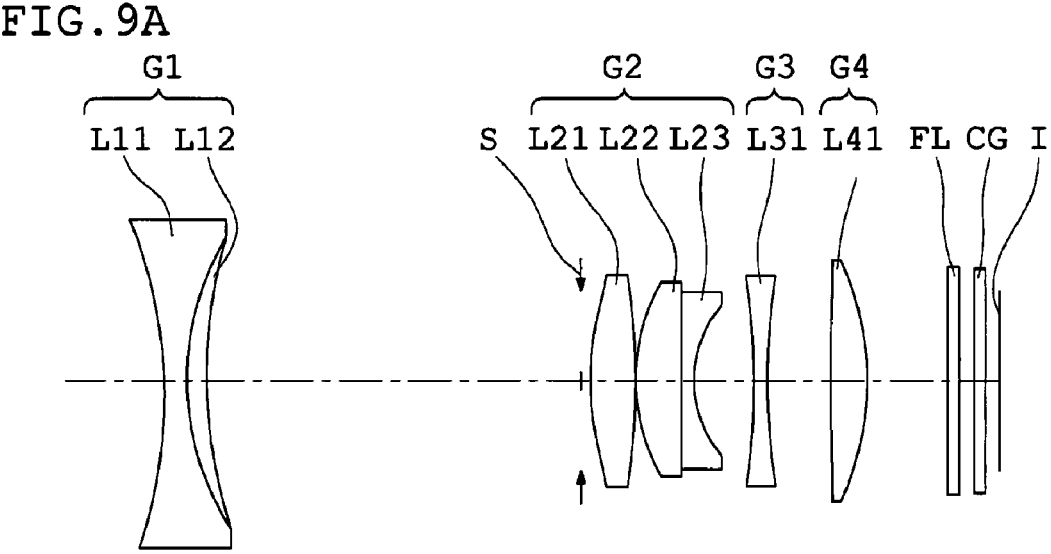
FIGS. 9A, 9B, and 9C are sectional views showing optical arrangements, developed along the optical axis, at wide-angle, middle, and telephoto positions, respectively, in infinite object point focusing of Embodiment 5 of the zoom optical system according to the present invention.
Figure 9B:
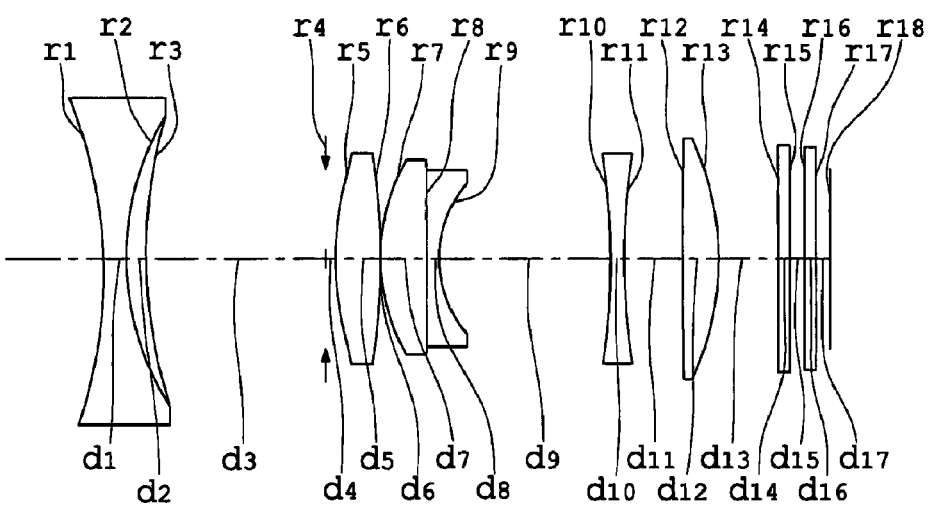
Figure 9C:
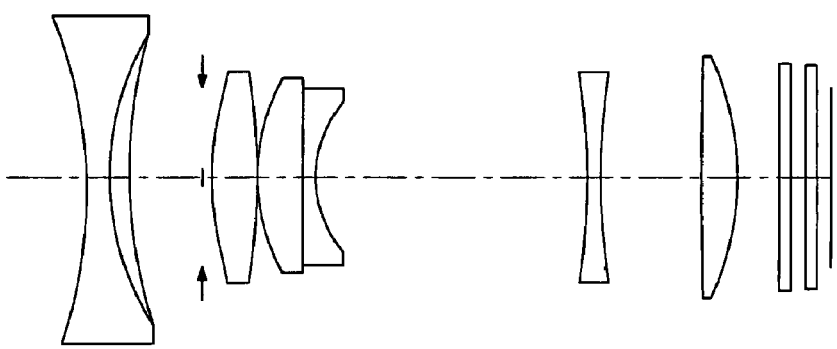

FIGS. 9A, 9B, and 9C are sectional views showing optical arrangements, developed along the optical axis, at wide-angle, middle, and telephoto positions, respectively, in infinite object point focusing of Embodiment 5 of the zoom optical system according to the present invention. FIGS. 10A-10D, 10E-10H, and 10I-10L are diagrams showing aberration characteristics at wide-angle, middle, and telephoto positions, respectively, in infinite object point focusing of the zoom optical system of FIGS. 9A-9C. In FIG. 9A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 5 has the lens units, the filter FL, and the cover glass CG. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1 is initially moved toward the image side and then is moved toward the object side. The second lens unit G2 is simply moved, together with the aperture stop S, along the optical axis toward the object side so that spacing between the first lens unit G1 and the second lens unit G2 is narrowed. The third lens unit G3 is moved back and forth along the optical axis in such a way that the third lens unit G3 is initially moved toward the image side to narrow the spacing between the third lens unit G3 and the fourth lens unit G4 and then is moved toward the object side. The fourth lens unit G4 is simply moved along the optical axis toward the image side.

Subsequently, numerical data of optical members constituting the zoom optical system of Embodiment 5 are shown below.

| Numerical data 5 | | | |
|---|---|---|---|
| $r_1 = -12.9570$ (aspherical surface) | $d_1 = 0.8000$ | $n_{d1} = 1.52542$ | $\nu_{d1} = 55.78$ |
| $r_2 = 10.4409$ | $d_2 = 0.7032$ | $n_{d2} = 1.63494$ | $\nu_{d2} = 23.22$ |
| $r_3 = 22.2162$ (aspherical surface) | $d_3 = D3$ | | |
| $r_4 = \infty$ (stop) | $d_4 = 0.3000$ | | |
| $r_5 = 8.6298$ (aspherical surface) | $d_5 = 1.8448$ | $n_{d5} = 1.83481$ | $\nu_{d5} = 42.71$ |
| $r_6 = -26.5988$ (aspherical surface) | $d_6 = 0.0791$ | | |
| $r_7 = 7.1432$ (aspherical surface) | $d_7 = 1.7812$ | $n_{d7} = 1.83481$ | $\nu_{d7} = 42.71$ |
| $r_8 = -239.3124$ | $d_8 = 0.4000$ | $n_{d8} = 1.80810$ | $\nu_{d8} = 22.76$ |
| $r_9 = 3.9369$ | $d_9 = D9$ | | |
| $r_{10} = -42.3355$ (aspherical surface) | $d_{10} = 0.5000$ | $n_{d10} = 1.52542$ | $\nu_{d10} = 55.78$ |
| $r_{11} = 19.6055$ | $d_{11} = D11$ | | |
| $r_{12} = 64.2346$ (aspherical surface) | $d_{12} = 1.3800$ | $n_{d12} = 1.83481$ | $\nu_{d12} = 42.71$ |
| $r_{13} = -9.6000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (imaging surface) | | | |

Aspherical coefficients

First surface $k = -3.9537$
$A_2 = 0$    $A_4 = 0$    $A_6 = 2.4737 \times 10^{-6}$    $A_8 = -3.9226 \times 10^{-8}$
$A_{10} = 0$ Third surface $k = -0.9087$
$A_2 = 0$    $A_4 = 7.1688 \times 10^{-5}$    $A_6 = 3.7777 \times 10^{-6}$    $A_8 = -4.9770 \times 10^{-8}$
$A_{10} = 0$ Fifth surface $k = -1.9337$
$A_2 = 0$    $A_4 = -3.4869 \times 10^{-4}$    $A_6 = -2.2526 \times 10^{-5}$    $A_8 = -5.7283 \times 10^{-8}$
$A_{10} = 0$ Sixth surface $k = -5.9352$
$A_2 = 0$    $A_4 = -3.7375 \times 10^{-4}$    $A_6 = -6.1314 \times 10^{-6}$    $A_8 = -1.7507 \times 10^{-7}$
$A_{10} = 0$ Seventh surface $k = 0.2051$
$A_2 = 0$    $A_4 = 8.5095 \times 10^{-5}$    $A_6 = 1.8765 \times 10^{-5}$    $A_8 = 4.8202 \times 10^{-7}$
$A_{10} = 1.0705 \times 10^{-8}$ Tenth surface $k = 43.0913$
$A_2 = 0$    $A_4 = -2.6920 \times 10^{-4}$    $A_6 = -1.0679 \times 10^{-5}$    $A_8 = 1.0544 \times 10^{-6}$
$A_{10} = 0$ Twelfth surface $k = 0$
$A_2 = 0$    $A_4 = -4.1294 \times 10^{-4}$    $A_6 = 3.6637 \times 10^{-6}$    $A_8 = 0$
$A_{10} = 0$ Refractive indices classified by wavelengths in medium constituting negative lens $L_{AN}$ nd = 1.525420    nC = 1.522680    nF = 1.532100    ng = 1.537050    nh = 1.540699

Refractive indices classified by wavelengths in medium constituting positive lens $L_{AP}$ nd = 1.634940    nC = 1.627290    nF = 1.654640    ng = 1.672908    nh = 1.689873

Zoom data (when D0 (distance from object to first surface) is infinite)

| | Wide-angle | Middle | Telephoto |
|---|---|---|---|
| F | 6.42000 | 11.01030 | 18.48958 |
| fno | 1.8685 | 2.4621 | 3.4244 |
| D0 | $\infty$ | $\infty$ | $\infty$ |
| D3 | 14.46707 | 7.07125 | 2.86615 |
| D9 | 2.20000 | 6.43367 | 10.48474 |
| D11 | 2.41629 | 2.29056 | 3.84331 |
| D13 | 3.12835 | 2.29609 | 1.60000 |
| D17 | 0.50012 | 0.50001 | 0.49950 |

Embodiment 6

Figure 11A:
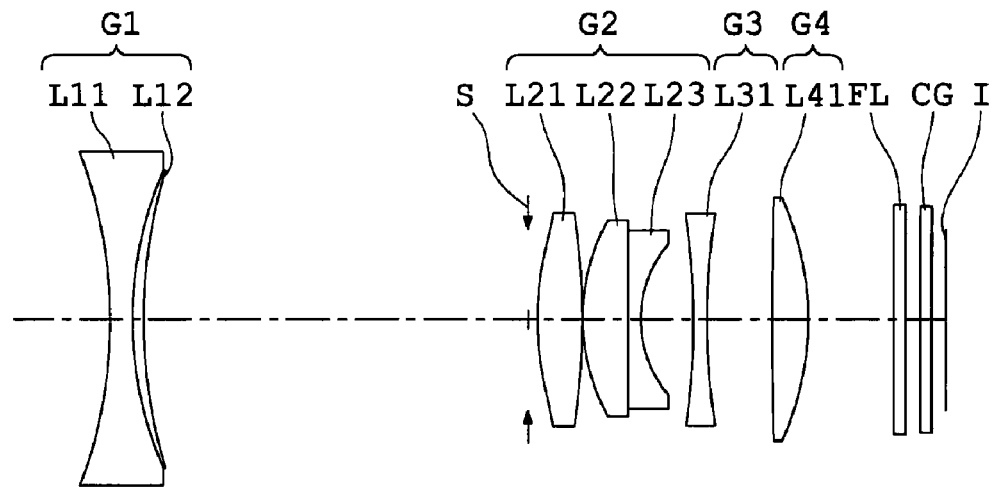
FIGS. 11A, 11B, and 11C are sectional views showing optical arrangements, developed along the optical axis, at wide-angle, middle, and telephoto positions, respectively, in infinite object point focusing of Embodiment 6 of the zoom optical system according to the present invention.
Figure 11B:
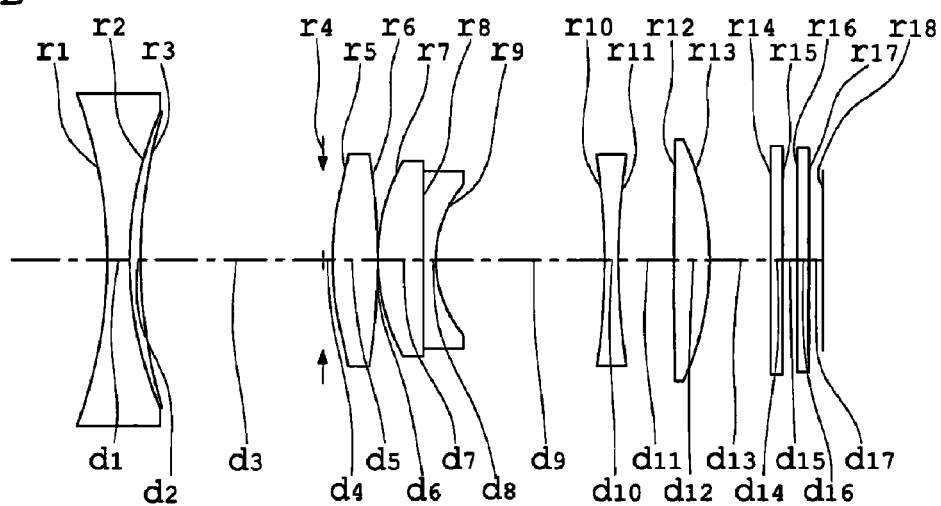
Figure 11C:
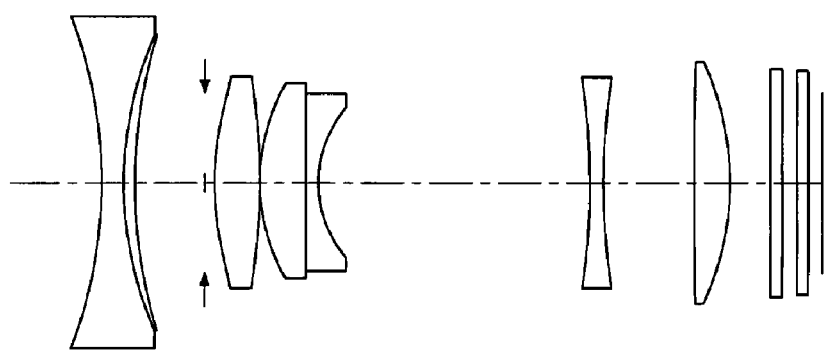

FIGS. 11A, 11B, and 11C are sectional views showing optical arrangements, developed along the optical axis, at wide-angle, middle, and telephoto positions, respectively, in infinite object point focusing of Embodiment 6 of the zoom optical system according to the present invention. FIGS. 12A-12D, 12E-12H, and 12I-12L are diagrams showing aberration characteristics at wide-angle, middle, and telephoto positions, respectively, in infinite object point focusing of the zoom optical system of FIGS. 11A-11C. In FIG. 11A, again, reference symbol I denotes the imaging surface of a CCD that is an electronic image sensor, denotes an aperture stop, FL denotes a plane-parallel plate-shaped filter, and CG denotes a plane-parallel plate-shaped CCD cover glass.

The zoom optical system of Embodiment 6 has the lens units, the filter FL, and the cover glass CG. The zoom optical system comprises, in order from the object side, a first lens unit G1 as the lens unit A, the aperture stop S, a second lens unit G2 as the lens unit B, a third lens unit G3 as the lens unit C, and a fourth lens unit G4 as the lens unit D.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented. The third lens unit G3 includes a biconcave lens L31. The fourth lens unit G4 includes a biconvex lens L41.

When the magnification is changed in the range from the wide-angle position to the telephoto position, the first lens unit G1 is moved back and forth along the optical axis in such a way that the first lens unit G1 is initially moved toward the image side and then is moved toward the object side. The second lens unit G2 is simply moved, together with the aperture stop S, along the optical axis toward the object side so that spacing between the first lens unit G1 and the second lens unit G2 is narrowed. The third lens unit G3 is moved back and forth along the optical axis in such a way that the third lens unit G3 is initially moved toward the image side to narrow the spacing between the third lens unit G3 and the fourth lens unit G4 and then is moved toward the object side. The fourth lens unit G4 is simply moved along the optical axis toward the image side.

Subsequently, numerical data of optical members constituting the zoom optical system of Embodiment 6 are shown below.

Numerical data 6

| | | | |
|---|---|---|---|
| $r_1 = -14.0769$ (aspherical surface) | $d_1 = 0.8000$ | $n_{d1} = 1.49700$ | $\nu_{d1} = 81.54$ |
| $r_2 = 13.0399$ | $d_2 = 0.4353$ | $n_{d2} = 1.63494$ | $\nu_{d2} = 23.22$ |
| $r_3 = 20.2304$ (aspherical surface) | $d_3 = D3$ | | |
| $r_4 = \infty$ (stop) | $d_4 = 0.3000$ | | |
| $r_5 = 8.3137$ (aspherical surface) | $d_5 = 1.8433$ | $n_{d5} = 1.83481$ | $\nu_{d5} = 42.71$ |
| $r_6 = -28.3034$ (aspherical surface) | $d_6 = 0.0791$ | | |
| $r_7 = 7.2890$ (aspherical surface) | $d_7 = 1.7325$ | $n_{d7} = 1.83481$ | $\nu_{d7} = 42.71$ |
| $r_8 = -234.9510$ | $d_8 = 0.4000$ | $n_{d8} = 1.80810$ | $\nu_{d8} = 22.76$ |
| $r_9 = 3.9450$ | $d_9 = D9$ | | |
| $r_{10} = -66.2077$ (aspherical surface) | $d_{10} = 0.5000$ | $n_{d10} = 1.52542$ | $\nu_{d10} = 55.78$ |
| $r_{11} = 15.5000$ | $d_{11} = D11$ | | |
| $r_{12} = 48.9767$ (aspherical surface) | $d_{12} = 1.3800$ | $n_{d12} = 1.83481$ | $\nu_{d12} = 42.17$ |
| $r_{13} = -9.8000$ | $d_{13} = D13$ | | |
| $r_{14} = \infty$ | $d_{14} = 0.5000$ | $n_{d14} = 1.54771$ | $\nu_{d14} = 62.84$ |
| $r_{15} = \infty$ | $d_{15} = 0.5000$ | | |
| $r_{16} = \infty$ | $d_{16} = 0.5000$ | $n_{d16} = 1.51633$ | $\nu_{d16} = 64.14$ |
| $r_{17} = \infty$ | $d_{17} = D17$ | | |
| $r_{18} = \infty$ (imaging surface) | | | |

Aspherical coefficients

First surface

$k = -1.7279$
$A_2 = 0$    $A_4 = 0$    $A_6 = 5.2480 \times 10^{-6}$    $A_8 = -6.5711 \times 10^{-8}$
$A_{10} = 0$

Third surface

$k = -3.2269$
$A_2 = 0$    $A_4 = -1.3187 \times 10^{-5}$    $A_6 = 6.6781 \times 10^{-6}$    $A_8 = -5.4466 \times 10^{-8}$
$A_{10} = 0$

Fifth surface

$k = -1.8346$
$A_2 = 0$    $A_4 = -3.1046 \times 10^{-4}$    $A_6 = -2.2024 \times 10^{-5}$    $A_8 = -1.4954 \times 10^{-7}$
$A_{10} = 0$

Sixth surface

$k = -5.2682$
$A_2 = 0$    $A_4 = -3.7806 \times 10^{-4}$    $A_6 = -3.7399 \times 10^{-6}$    $A_8 = -2.7381 \times 10^{-7}$
$A_{10} = 0$

Seventh surface

$k = 0.1385$
$A_2 = 0$    $A_4 = 6.1956 \times 10^{-5}$    $A_6 = 1.9211 \times 10^{-5}$    $A_8 = 7.5338 \times 10^{-7}$
$A_{10} = 0$ -continued Numerical data 6

Tenth surface k = 0
$A_2 = 0$      $A_4 = -5.4575 \times 10^{-4}$    $A_6 = 1.3347 \times 10^{-5}$    $A_8 = 0$
$A_{10} = 0$ Twelfth surface k = 0
$A_2 = 0$      $A_4 = -2.7359 \times 10^{-4}$    $A_6 = 0$    $A_8 = 0$
$A_{10} = 0$ Refractive indices classified by wavelengths in medium constituting negative lens $L_{AN}$ nd = 1.496999    nC = 1.495136    nF = 1.501231    ng = 1.504506    nh = 1.507205

Refractive indices classified by wavelengths in medium constituting positive lens $L_{AP}$ nd = 1.634940    nC = 1.627290    nF = 1.654640    ng = 1.672908    nh = 1.689873

Zoom data (when D0 (distance from object to first surface) is infinite)

|  | Wide-angle | Middle | Telephoto |
|---|---|---|---|
| F | 6.42001 | 11.01031 | 18.48963 |
| fno | 1.8421 | 2.4257 | 3.3791 |
| D0 | ∞ | ∞ | ∞ |
| D3 | 14.83968 | 7.18523 | 2.75812 |
| D9 | 1.89368 | 6.35451 | 10.50890 |
| D11 | 2.48563 | 2.12545 | 3.45724 |
| D13 | 3.31078 | 2.34496 | 1.59995 |
| D17 | 0.50015 | 0.50001 | 0.49931 |

Embodiment 7

Figure 13A:
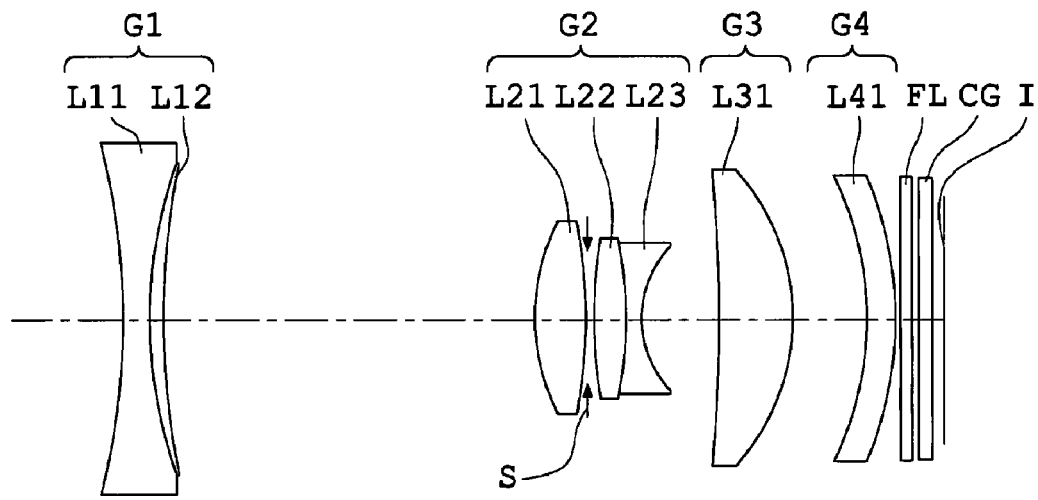
FIGS. 13A, 13B, and 13C are sectional views showing optical arrangements, developed along the optical axis, at wide-angle, middle, and telephoto positions, respectively, in infinite object point focusing of Embodiment 7 of the zoom optical system according to the present invention.
Figure 13B:
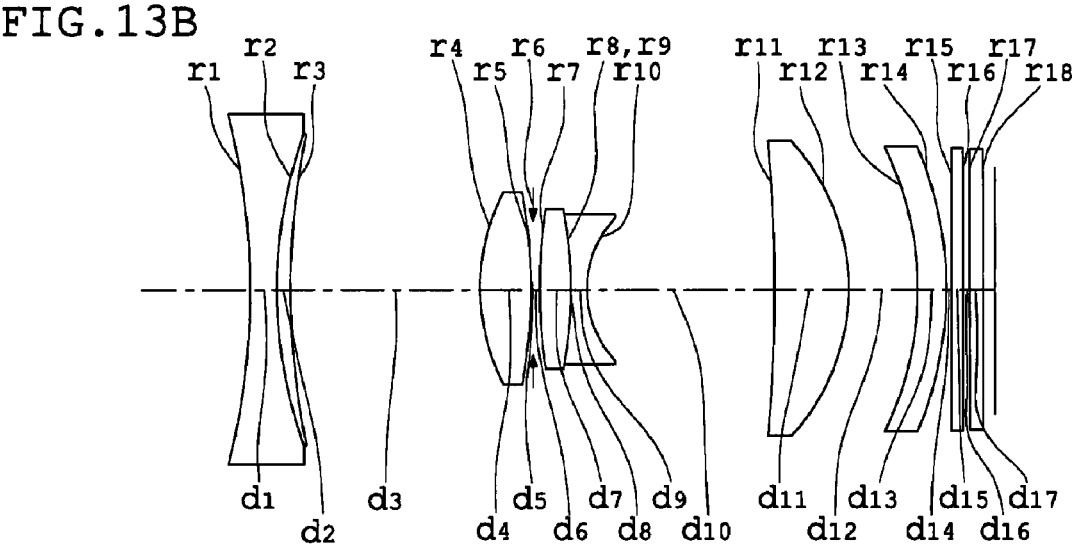
Figure 13C:
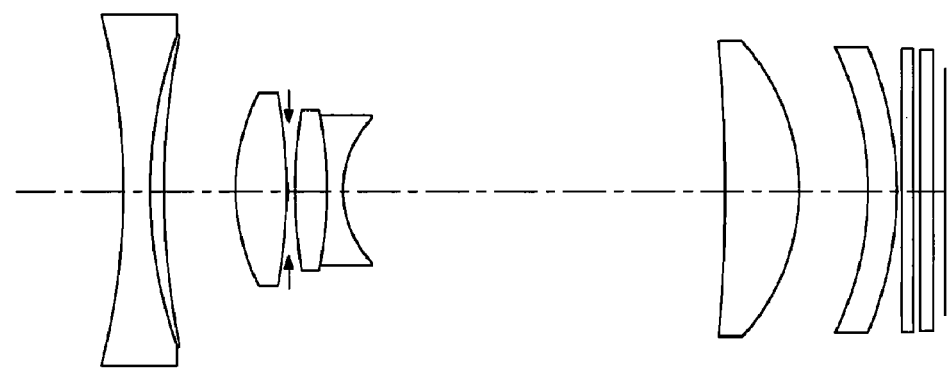

FIGS. 13A, 13B, and 13C are sectional views showing optical arrangements, developed along the optical axis, at wide-angle, middle, and telephoto positions, respectively, in infinite object point focusing of Embodiment 7 of the zoom optical system according to the present invention. FIGS. 14A-14D, 14E-14H, and 14I-14L are diagrams showing aberration characteristics at wide-angle, middle, and telephoto positions, respectively, in infinite object point focusing of the zoom optical system of FIGS. 13A-13C. In FIG. 13A, again, reference symbol I denotes the imaging surface of a CCD that is an electronic image sensor, S denotes an aperture stop, FL denotes a plane-parallel plate-shaped filter, and CG denotes a plane-parallel plate-shaped CCD cover glass.

The zoom optical system of Embodiment 7 has the lens units, the filter FL, the cover glass CG, and the CCD. The zoom optical system comprises, in order from the object side, a first lens unit G1 as the lens unit A, a second lens unit G2 as the lens unit B, a third lens unit G3 as the lens unit C, and a fourth lens unit G4 as the lens unit D. The aperture stop S is placed inside the second lens unit G2.

The first lens unit G1 includes a cemented lens in which a biconcave lens L11 and a positive meniscus lens L12 with a convex surface facing the object side are cemented, and is constructed with a negative lens component as a whole. The positive meniscus lens L12 with the convex surface facing the object side is a lens using energy curing resin and is configured on the biconcave lens L11. The second lens unit G2 includes a biconvex lens L21 and a cemented lens in which a biconvex lens L22 and a biconcave lens L23 are cemented. The aperture stop is interposed between the biconvex lens L21 and the cemented lens. The third lens unit G3 includes a positive meniscus lens L31 with a convex surface facing the image side. The fourth lens unit G4 includes a positive meniscus lens L41 with a convex surface facing the image side.

When the magnification is changed in the range from the wide-angle position to the telephoto position, the first lens unit G1 is moved back and forth along the optical axis in such a way that the first lens unit G1 is initially moved toward the image side and then is moved toward the object side. The second lens unit G2 is simply moved, together with the aperture stop S, along the optical axis toward the object side so that spacing between the first lens unit G1 and the second lens unit G2 is narrowed. The third lens unit G3 is moved back and forth along the optical axis in such a way that the third lens unit G3 is initially moved toward the image side to narrow the spacing between the third lens unit G3 and the fourth lens unit G4 and then is moved toward the object side. The fourth lens unit G4 is not moved.

Subsequently, numerical data of optical members constituting the zoom optical system of Embodiment 7 are shown below.

Numerical data 7

$r_1 = -13.763$ (aspherical surface)    $d_1 = 0.900$    $n_{d1} = 1.58313$    $v_{d1} = 59.38$
$r_2 = 12.899$ (aspherical surface)    $d_2 = 0.411$    $n_{d2} = 1.63494$    $v_{d2} = 23.22$
$r_3 = 26.212$ (aspherical surface)    $d_3 = D3$ -continued

Numerical data 7

| | | | |
|---|---|---|---|
| $r_4 = 4.842$ (aspherical surface) | $d_4 = 1.769$ | $n_{d4} = 1.80139$ | $v_{d4} = 45.46$ |
| $r_5 = -17.622$ (aspherical surface) | $d_5 = 0.100$ | | |
| $r_6 = \infty$ (stop) | $d_6 = 0.200$ | | |
| $r_7 = 13.790$ | $d_7 = 1.130$ | $n_{d7} = 1.80100$ | $v_{d7} = 34.97$ |
| $r_8 = -11.621$ | $d_8 = 0.007$ | $n_{d8} = 1.56384$ | $v_{d8} = 60.67$ |
| $r_9 = -11.621$ | $d_9 = 0.500$ | $n_{d9} = 1.80518$ | $v_{d9} = 25.42$ |
| $r_{10} = 3.138$ | $d_{10} = D10$ | | |
| $r_{11} = -37.451$ | $d_{11} = 2.390$ | $n_{d11} = 1.52542$ | $v_{d11} = 55.78$ |
| $r_{12} = -5.671$ (aspherical surface) | $d_{12} = D12$ | | |
| $r_{13} = -11.611$ (aspherical surface) | $d_{13} = 1.000$ | $n_{d13} = 1.52542$ | $v_{d13} = 55.78$ |
| $r_{14} = -10.000$ | $d_{14} = 0.130$ | | |
| $r_{15} = \infty$ | $d_{15} = 0.400$ | $n_{d15} = 1.54771$ | $v_{d15} = 62.84$ |
| $r_{16} = \infty$ | $d_{16} = 0.200$ | | |
| $r_{17} = \infty$ | $d_{17} = 0.500$ | $n_{d17} = 1.51633$ | $v_{d17} = 64.14$ |
| $r_{18} = \infty$ | | | |

Aspherical coefficients

First surface $k = -11.8073$
$A_4 = -4.3618 \times 10^{-4}$  $A_6 = 3.8856 \times 10^{-5}$  $A_8 = 1.3045 \times 10^{-6}$  $A_{10} = 1.5738 \times 10^{-8}$
$A_{12} = 0$  $A_{14} = 0$  $A_{16} = 0$  $A_{18} = 0$  $A_{20} = 0$

Second surface $k = -68.5453$
$A_4 = 1.2061 \times 10^{-3}$  $A_6 = -2.3931 \times 10^{-5}$  $A_8 = 2.6541 \times 10^{-7}$  $A_{10} = 0$
$A_{12} = 0$  $A_{14} = 0$  $A_{16} = 0$  $A_{18} = 0$  $A_{20} = 0$

Third surface $k = -77.8212$
$A_4 = 2.0577 \times 10^{-4}$  $A_6 = 3.6533 \times 10^{-5}$  $A_8 = -1.6516 \times 10^{-6}$  $A_{10} = 2.1313 \times 10^{-8}$
$A_{12} = 0$  $A_{14} = 0$  $A_{16} = 0$  $A_{18} = 0$  $A_{20} = 0$

Fourth surface $k = -2.5494$
$A_4 = 1.8620 \times 10^{-3}$  $A_6 = -9.3264 \times 10^{-5}$  $A_8 = -3.0629 \times 10^{-6}$  $A_{10} = 0$
$A_{12} = 0$  $A_{14} = 0$  $A_{16} = 0$  $A_{18} = 0$  $A_{20} = 0$

Fifth surface $k = -4.6926$
$A_4 = 8.2896 \times 10^{-4}$  $A_6 = -1.6537 \times 10^{-4}$  $A_8 = 5.9244 \times 10^{-6}$  $A_{10} = 0$
$A_{12} = 0$  $A_{14} = 0$  $A_{16} = 0$  $A_{18} = 0$  $A_{20} = 0$

Twelfth surface $k = -1.6436$
$A_4 = -4.5607 \times 10^{-4}$  $A_6 = 1.3950 \times 10^{-6}$  $A_8 = 2.7378 \times 10^{-7}$  $A_{10} = -5.7200 \times 10^{-9}$
$A_{12} = 0$  $A_{14} = 0$  $A_{16} = 0$  $A_{18} = 0$  $A_{20} = 0$

Thirteenth surface $k = -0.9892$
$A_4 = -2.1476 \times 10^{-3}$  $A_6 = 6.9184 \times 10^{-5}$  $A_8 = -1.2423 \times 10^{-7}$  $A_{10} = 0$
$A_{12} = 0$  $A_{14} = 0$  $A_{16} = 0$  $A_{18} = 0$  $A_{20} = 0$

Refractive indices classified by wavelengths in medium constituting negative lens $L_{AN}$ nd = 1.583126   nC = 1.580139   nF = 1.589960   ng = 1.595296   nh = 1.599721

Refractive indices classified by wavelengths in medium constituting negative lens $L_{Ap}$ nd = 1.634940   nC = 1.627290   nF = 1.654640   ng = 1.672908   nh = 1.689875

Zoom data (when D0 (distance from object to first surface) is infinite)

| | Wide-angle | Middle | Telephoto |
|---|---|---|---|
| F | 6.320 | 10.491 | 18.202 |
| fno | 2.601 | 3.440 | 4.944 |
| D3 | 12.667 | 6.493 | 2.330 |
| D10 | 2.624 | 6.366 | 12.953 |
| D12 | 2.542 | 2.437 | 2.550 |

Subsequently, corresponding parameter values in individual embodiments of the present invention described above are shown in Table 1.

image processing means 51 so that a photographed electronic image can also be recorded. Also, the memory may be provided to be independent of the image processing means 51 or

TABLE 1

|  | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| fw | 6.42002 | 6.41984 | 6.41996 | 6.42000 | 6.42000 | 6.42001 | 6.320 |
| $y_{10}$ | 3.6 | 3.6 | 3.6 | 3.6 | 3.6 | 3.6 | 3.84 |
| vdp | 23.22 | 15.00 | 15.00 | 23.22 | 23.22 | 23.22 | 23.22 |
| θgFp | 0.7001 | 0.7800 | 0.7122 | 0.6679 | 0.6679 | 0.6679 | 0.6679 |
| θhgp | 0.6765 | 0.8160 | 0.6976 | 0.6203 | 0.6203 | 0.6203 | 0.6203 |
| ndp | 1.63494 | 1.70999 | 1.75000 | 1.63494 | 1.63494 | 1.63494 | 1.63494 |
| βp | 0.7379 | 0.8045 | 0.7367 | 0.7057 | 0.7057 | 0.7057 | 0.7057 |
| βhgp | 0.7287 | 0.8498 | 0.7314 | 0.6725 | 0.6725 | 0.6725 | 0.6725 |
| $Z_{AF}$ (4.494) | −0.70327 | −0.56446 | −0.37389 | −0.69299 | −0.70637 | −0.67222 | −0.61679 |
| $Z_{AC}$ (4.494) | 0.78934 | 0.76173 | 1.33221 | 0.77798 | 1.01666 | 0.79887 | 0.72719 |
| $Z_{AR}$ (4.494) | 0.51930 | 0.53794 | 0.71270 | 0.45251 | 0.50704 | 0.52671 | 0.45639 |
| $|Z_{AR}(h)/Z_{AC}(h)|/tp$ * value at h = 4.494 | 0.6373 | 0.6367 | 0.9047 | 0.6815 | 0.7247 | 0.6252 | 0.65872 |
| tp/tn | 0.5296 | 0.4394 | 0.8560 | 0.5970 | 0.8790 | 0.5441 | 0.4567 |
| $k_{AF}$ | −2.8817 | −10.2252 | 0.6227 | −6.4093 | −3.9537 | −1.7279 | −11.8073 |
| $k_{AR}$ | −2.9323 | 3.8529 | −0.5547 | −2.4919 | −0.9087 | −3.2269 | −77.8212 |
| $Z_{AF}(h)/Z_{AR}(h)$ * value at h = 4.494 | −1.3543 | −1.0493 | −0.5246 | −1.5314 | −1.3931 | −1.2763 | −1.35145 |
| $y_{07}$ | 2.52 | 2.52 | 2.52 | 2.52 | 2.52 | 2.52 | 2.688 |
| $\tan \omega_{07w}$ | 0.41890 | 0.41843 | 0.41853 | 0.41919 | 0.41863 | 0.41984 | 0.43335 |
| $d_{CD}/fw$ | 0.3719 | 0.3653 | 0.4443 | 0.3225 | 0.3764 | 0.3872 | 0.4022 |
| $(R_{CF} + R_{CR})/(R_{CF} − R_{CR})$ | 0.2041 | 0.5509 | 0.4148 | −0.4058 | 0.3670 | 0.6206 | *** |
| $(R_{DF} + R_{DR})/(R_{DF} − R_{DR})$ | 0.7383 | 0.8370 | 0.8298 | 0.6852 | 0.7400 | 0.6665 | *** |
| vdn | 81.54 | 59.38 | 49.34 | 81.54 | 81.54 | 81.54 | 59.38 |
| θgFn | 0.5386 | 0.5438 | 0.5528 | 0.5373 | 0.5373 | 0.5373 | 0.5438 |
| θhgn | 0.4417 | 0.4501 | 0.4638 | 0.4428 | 0.4428 | 0.4428 | 0.4501 |
| ndn | 1.49700 | 1.58913 | 1.74320 | 1.49700 | 1.49700 | 1.49700 | 1.58313 |
| θgFp − θgFn | 0.1615 | 0.2362 | 0.1594 | 0.1306 | 0.1306 | 0.1306 | 0.1241 |
| θhgp − θhgn | 0.2348 | 0.3659 | 0.2338 | 0.1775 | 0.1775 | 0.1775 | 0.1702 |
| vdp − vdn | −58.32 | −44.38 | −34.34 | −58.32 | −58.32 | −58.32 | −36.16 |

The zoom optical system of the present invention described above can be used in a photographing apparatus for photographing the image of the object through the electronic image sensor, such as a CCD or CMOS, notably in a digital camera and a video camera, and in a personal computer, a telephone, and a mobile terminal, particularly in a mobile phone that is handy to carry, which are examples of information processing apparatuses. What follows is a description of an example of the digital camera as its aspect.

Figure 15:
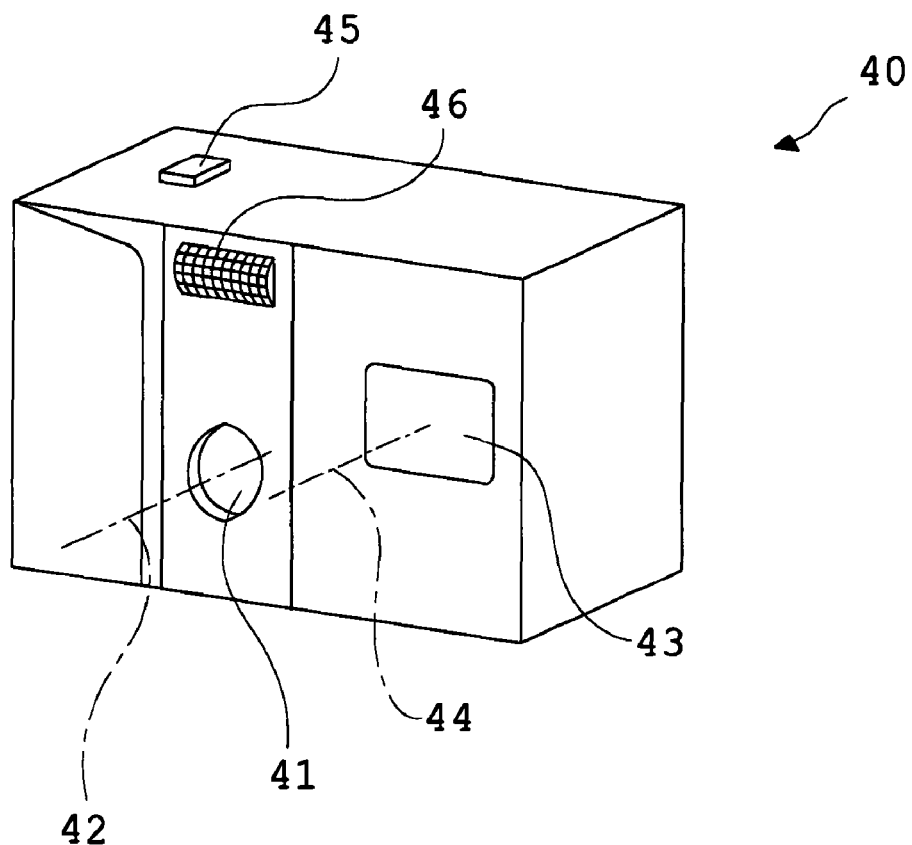
FIG. 15 is a front perspective view showing the appearance of a digital camera incorporating the zoom optical system according to the present invention.
Figure 16:
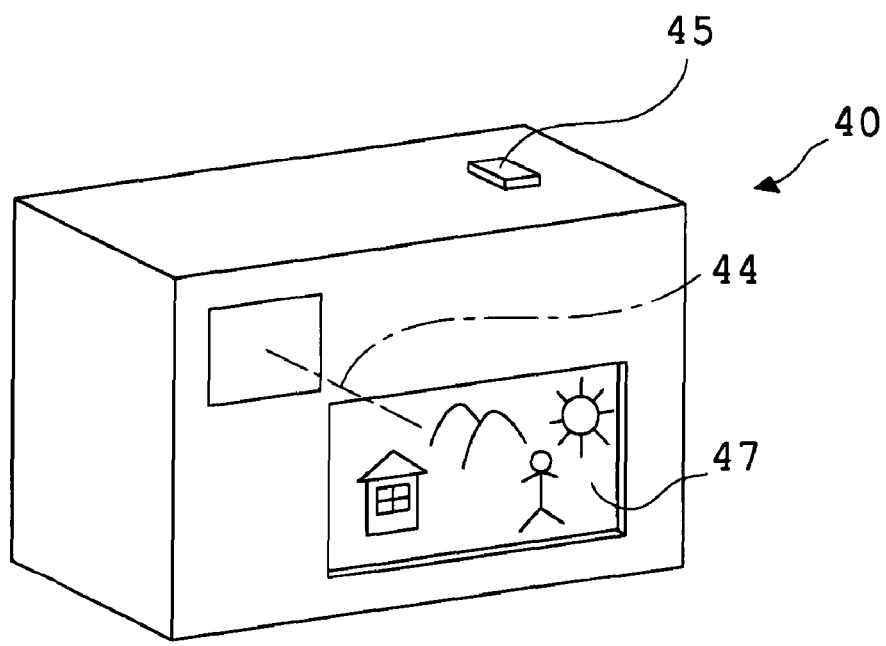
FIG. 16 is a rear perspective view showing the digital camera of FIG. 15.
Figure 17:
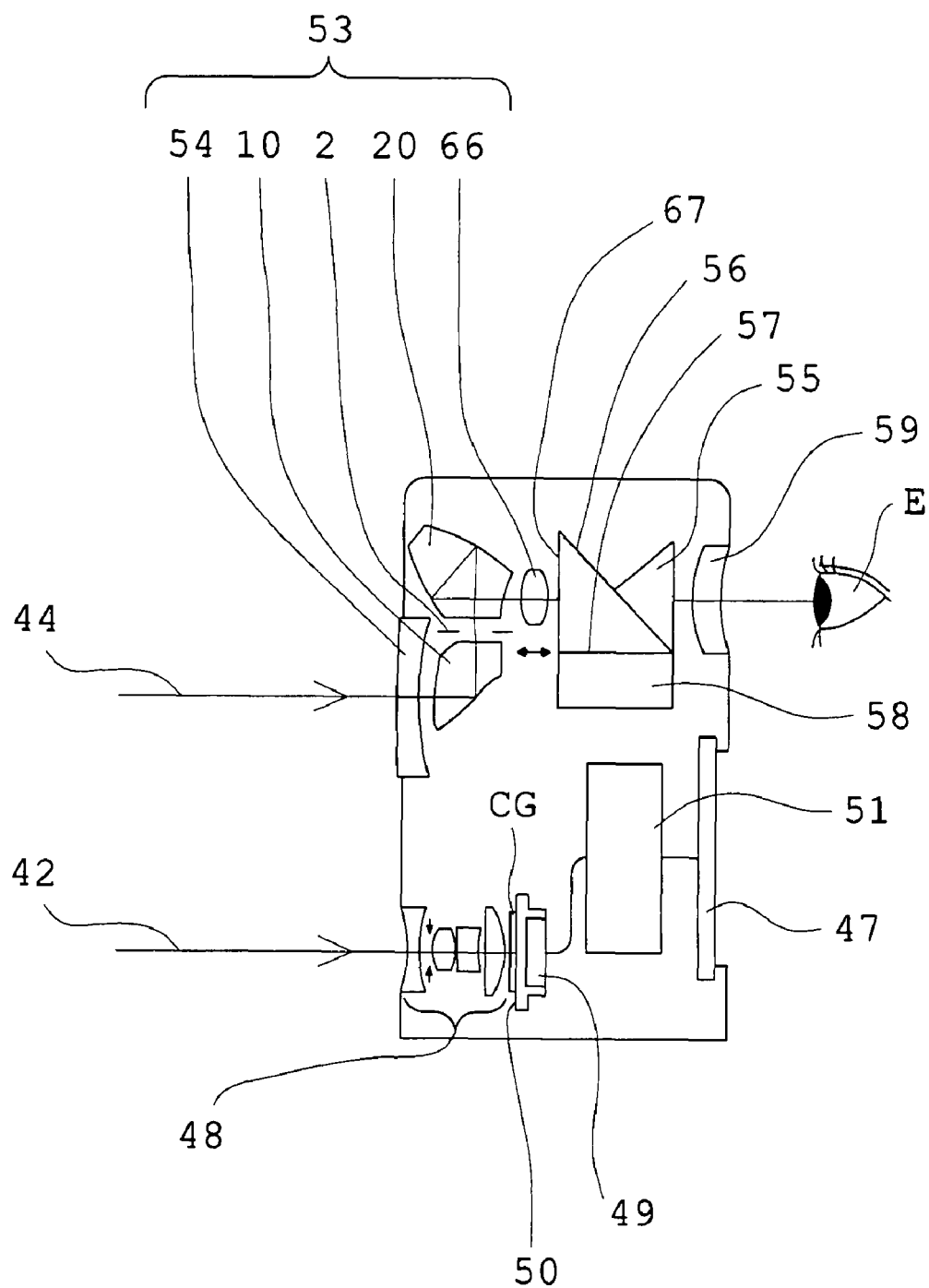
FIG. 17 is a sectional view showing the optical structure of the digital camera of FIG. 15.

FIGS. 15-17 show a digital camera incorporating the imaging optical system according to the present invention in a photographing optical system 41. FIG. 15 is a front perspective view showing the appearance of a digital camera 40. FIG. 16 is a rear perspective view showing the digital camera. FIG. 17 is a sectional view showing the optical structure of the digital camera 40.

The digital camera 40, in this example, includes the photographing optical system 41 having a photographing optical path 42, a finder optical system 43 having a finder optical path 44, a shutter button 45, a flash lamp 46, and a liquid crystal display monitor 47. When a photographer pushes the shutter button 45 provided on the upper face of the camera 40, photographing is performed, in association with this shutter operation, through the photographing optical system 41, for example, the zoom optical system of Embodiment 1.

An image of an object produced by the photographing optical system 41 is formed on the imaging surface of a CCD 49. The image of the object received by the CCD 49 is displayed as an electronic image on the liquid crystal display monitor 47 provided on the back face of the camera, through an image processing means 51. A memory is placed in the may be constructed so that the image is electronically recorded and written by a floppy (a registered trademark) disk, memory card, or MO.

Further, a finder objective optical system 53 is located on the finder optical path 44. The finder objective optical system 53 includes a cover lens 54, a first prism 10, an aperture stop 2, a second prism 20, and a focusing lens 66. The image of the object is produced on an imaging surface 67 by the finder objective optical system 53. The image of the object is formed on a field frame 57 of a Porro prism 55 that is an image erecting member. Behind the Porro prism 55 is located an eyepiece optical system 59 that introduces an erected image into an observer's eye E.

According to the digital camera 40 constructed as mentioned above, it is possible to realize the electronic imaging apparatus having the zoom optical system in which the number of constituents of the photographing optical system 41 is reduced and the small-sized and slim design is achieved.

The present invention is favorable to the fields of the zoom optical system suitable for an electronic imaging optical system that needs to satisfy the slim design, high imaging performance, and the large aperture ratio at the same time so that an object can be clearly photographed even in surroundings in which the amount of light is small, and of the electronic imaging apparatus having this zoom optical system.

What is claimed is:

1. An electronic imaging apparatus having a zoom optical system, the electronic imaging apparatus comprising:
a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position with the optical axis, and fw is a focal length of an entire system of the zoom optical system at the wide-angle position, and wherein the zoom optical system has a lens unit B adjacent to the lens unit A, and the lens unit B includes a single lens component and a cemented lens component, or three lenses.

2. An electronic imaging apparatus having a zoom optical system according to claim 1, wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$.

3. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, wherein the zoom optical system has a lens unit B adjacent to the lens unit A, and the lens unit B includes two lens components, a single lens component and a cemented lens component, or three lenses, wherein the lens unit A includes a cemented lens component of a positive lens $L_{AP}$ and a negative lens $L_{AN}$, the positive lens $L_{AP}$ is a lens using energy curing resin and is configured directly on the negative lens $L_{AN}$, and wherein the cemented lens component of the lens unit A includes, in order from an object side, the negative lens $L_{AN}$ and the positive lens $L_{AP}$.

4. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, wherein the zoom optical system has a lens unit B adjacent to the lens unit A, and the lens unit B includes two lens components, a single lens component and a cemented lens component, or three lenses, wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$, and wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (a)$$

the zoom optical system satisfies the following condition:

$$0.1 \leq |z_{AR}(h) - z_{AC}(h)|/tp \leq 0.96$$

where $z_{AC}$ is a shape of a cementation-side surface, according to Equation (a), of the positive lens $L_{AP}$; $z_{AR}$ is a shape of an air-contact-side surface, according to Equation (a), of the positive lens $L_{AP}$; h is expressed by h=0.7 fw when the focal length of the entire system of the zoom optical system at the wide-angle position is denoted by fw; tp is a thickness, measured along the optical axis, of the positive lens $L_{AP}$, and always z (0)=0.

5. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when 10 denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, wherein the zoom optical system has a lens unit B adjacent to the lens unit A, and the lens unit B includes two lens components, a single lens component and a cemented lens component, or three lenses, wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (a)$$

the zoom optical system satisfies the following conditions:

$$-50 \leq k_{AF} \leq 10$$

$$-20 \leq k_{AR} \leq 20$$

and further satisfies the following condition:

$$-8 \leq z_{AF}(h)/z_{AR}(h) \leq 2$$

where $k_{AF}$ is a k value relative to a most object-side surface of the lens unit A and $k_{AR}$ is a k value relative to a most image-side surface of the lens unit A, each of which is the k value in Equation (a); $z_{AF}$ is a shape of the most object-side surface of the lens unit A; $z_{AR}$ is a shape of the most image-side surface of the lens unit A; and h is expressed by h=0.7 fw when the focal length of the entire system of the zoom optical system at the wide-angle position is denoted by fw.

6. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, wherein the zoom optical system has a lens unit B adjacent to the lens unit A, and the lens unit B includes two lens components, a single lens component and a cemented lens component, or three lenses, wherein the lens unit A includes a cemented lens component of a positive lens $L_{AP}$ and a negative lens $L_{AN}$, and the positive lens $L_{AP}$ is a lens using energy, curing resin and is configured directly on the negative lens $L_{AN}$, and wherein a distance along the optical axis between the lens unit A and the lens unit B is varied for a purpose of changing the magnification; the biconcave-shaped negative lens component of the lens unit A is the cemented lens component of the positive lens $L_{AP}$ and the negative lens $L_{AN}$; and in an orthogonal coordinate system in which an axis of abscissas is taken as vdp and an axis of ordinates is taken as θgFp, when a straight line expressed by $$\theta gFp = \alpha p \times vdp + \beta p \text{ (where } \alpha p = -0.00163\text{)}$$

is set, a coordinate (vdp, θgFp) of the positive lens $L_{AP}$ is contained in an overlapped region of a region defined between a straight line in a lower limit of Condition (a) described below and a straight line in an upper limit of Condition (a) and a region defined by Condition (b) described below:

$$0.6400 < \beta p < 0.9000 \quad (a)$$

$$3 < vdp < 27 \quad (b)$$

where θgFp is a partial dispersion ratio (ng−nF)/(nF−nC) of the positive lens $L_{AP}$, vdp is an Abbe's number (nd−1)/(nF−nC) of the positive lens $L_{AP}$, nd is a refractive index relative to the d line, nC is a refractive index relative to the C line, nF is a refractive index relative to the F line, and ng is a refractive index relative to the g line.

7. An electronic imaging apparatus having a zoom optical system according to claim 6, wherein in an orthogonal coordinate system in which an axis of abscissas is taken as vdp and an axis of ordinates is taken as θhgp, when a straight line expressed by θhgp=αhgp×vdp+βhgp (where αhgp=−0.00225)

is set, a coordinate (vdp, θhgp) of the positive lens $L_{AP}$ is contained in an overlapped region of a region defined between a straight line in a lower limit of Condition (c) described below and a straight line in an upper limit of Condition (c) and a region defined by Condition (b) described below:

0.5700<βhgp<0.9500 (c)

3<vdp<27 (b)

where θhgp is a partial dispersion ratio (nh−ng)/(nF−nC) of the positive lens $L_{AP}$, and nh is a refractive index relative to the h line.

8. An electronic imaging apparatus having a zoom optical system according to claim 6 or 7, wherein the zoom optical system satisfies the following condition:

0.08≦θgFp−θgFn≦0.50 where θgFn is a partial dispersion ratio (ng−nF)/(nF−nC) of the negative lens $L_{AN}$.

9. An electronic imaging apparatus having a zoom optical system according to claim 8, wherein the zoom optical system satisfies the following condition:

0.09≦θhgp−θhgn≦0.60 where θhgp is a partial dispersion ratio (nh−ng)/(nF−nC) of the positive lens $L_{AP}$, θhgn is a partial dispersion ratio (nh−ng)/(nF−nC) of the negative lens $L_{AN}$, and nh is a refractive index relative to the h line.

10. An electronic imaging apparatus having a zoom optical system according to claim 9, wherein the zoom optical system satisfies the following condition:

vdp−vdn≦−30 where vdn is an Abbe's number (nd−1)/(nF−nC) of the negative lens $L_{AN}$.

11. An electronic imaging apparatus having a zoom optical system according to claim 2, wherein a cementing surface of the cemented lens component of the lens unit A is configured as an aspherical surface.

12. An electronic imaging apparatus having a zoom optical system, the electronic imaging apparatus comprising:
   a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
   an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
   wherein in nearly infinite object point focusing, the zoom optical system satisfies the following condition:

0.7<$y_{07}$/(fw·tan $ω_{07w}$)<0.94 where $y_{07}$ is expressed by $y_{07}$=0.7$y_{10}$ when $y_{10}$ denotes a distance from a center to a point farthest from the center (a maximum image height) within an effective imaging surface (an imageable surface) of the electronic image sensor, $ω_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
   wherein the zoom optical system has a lens unit B adjacent to the lens unit A, and the lens unit B includes two lens components, a single lens component and a cemented lens component, or three lenses,
   wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$,
   wherein a cementing surface of the cemented lens component of the lens unit A is configured as an aspherical surface, and
   wherein the aspherical surface of the cementing surface of the cemented lens component of the lens unit A has a convergence property stronger than in a spherical surface in going from the optical axis to a periphery.

13. An electronic imaging apparatus having a zoom optical system, the electronic imaging apparatus comprising:
   a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
   an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
   wherein in nearly infinite object point focusing, the zoom optical system satisfies the following condition:

0.7<$y_{07}$/(fw·tan $ω_{07w}$)<0.94 where $y_{07}$ is expressed by $y_{07}$=0.7$y_{10}$ when $y_{10}$ denotes a distance from a center to a point farthest from the center (a maximum image height) within an effective imaging surface (an imageable surface) of the electronic image sensor, $ω_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
   wherein the zoom optical system has a lens unit B adjacent to the lens unit A, and the lens unit B includes two lens components, a single lens component and a cemented lens component, or three lenses,
   wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$, wherein a cementing surface of the cemented lens component of the lens unit A is configured as an aspherical surface, and wherein a difference of the refractive index relative to the d line between the positive lens $L_{AP}$ and the negative lens $L_{AN}$ is 0.2 or less.

14. An electronic imaging apparatus having a zoom optical system according to claim 2, wherein a refractive index ndp of the positive lens $L_{AP}$, relative to the d line, satisfies the following condition:

$$1.50 \leq ndp \leq 1.85.$$

15. An electronic imaging apparatus having a zoom optical system according to claim 1 or 2, wherein the zoom optical system further has, on the image side of the lens unit B, a negative lens unit C and a positive lens unit D with a spacing between the lens unit C and the lens unit D being variable.

16. An electronic imaging apparatus having a zoom optical system, the electronic imaging apparatus comprising:
   a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
   an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
   wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
   wherein the zoom optical system has a lens unit B adjacent to the lens unit A, and the lens unit B includes two lens components, a single lens component and a cemented lens component, or three lenses,
   wherein the zoom optical system further has, on the image side of the lens unit B, a negative lens unit C and a positive lens unit D with a spacing between the lens unit C and the lens unit D being variable, and
   wherein the zoom optical system satisfies the following condition:

$$0.2 \leq d_{CD}/fw \leq 1.2$$

where $d_{CD}$ is a spacing along the optical axis between the lens unit C and the lens unit D in infinite focusing at the wide-angle position and fw is the focal length of the entire system of the zoom optical system at the wide-angle position.

17. An electronic imaging apparatus having a zoom optical system according to claim 15, wherein when the magnification is changed in the range from the wide-angle position to the telephoto position, the lens unit C and the lens unit D are moved together in such a way that the spacing between the lens unit C and the lens unit D is simply widened or the lens unit D approaches the image side.

18. An electronic imaging apparatus having a zoom optical system, the electronic imaging apparatus comprising:
   a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
   an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
   wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
   wherein the zoom optical system has a lens unit B adjacent to the lens unit A, and the lens unit B includes two lens components, a single lens component and a cemented lens component, or three lenses,
   wherein the zoom optical system further has, on the image side of the lens unit B, a negative lens unit C and a positive lens unit D with a spacing between the lens unit C and the lens unit D being variable, and
   wherein the lens unit C and the lens unit D are moved while changing the spacing therebetween in focusing.

19. An electronic imaging apparatus having a zoom optical system according to claim 18, wherein the spacing between the lens unit C and the lens unit D is narrowed as focusing toward a shorter distance is performed in a state where the lens unit A and the lens unit B are fixed.

20. An electronic imaging apparatus having a zoom optical system according to claim 15, wherein the lens unit C includes a negative lens alone and the lens unit D includes a positive lens alone.

21. An electronic imaging apparatus having a zoom optical system according to claim 1 or 2, wherein the zoom optical system further has, on the image side of the lens unit B, a negative lens unit C and a lens unit D that includes a meniscus lens with a convex surface facing the image side, a spacing between the lens unit C and the lens unit D being variable.

22. An electronic imaging apparatus having a zoom optical system according to claim 1 or 2, wherein the zoom optical system further has a positive lens unit C including a positive lens alone.

23. An electronic imaging apparatus having a zoom optical system, the electronic imaging apparatus comprising:
a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07}=0.7y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, and
wherein the zoom optical system has a lens unit B adjacent to the lens unit A and further has, on the image side of the lens unit B and in order from the object side, a negative lens unit C and a positive lens unit D, a spacing between the lens unit C and the lens unit D being variable, and a spacing between the lens unit B and the lens unit C being variable.

24. An electronic imaging apparatus having a zoom optical system according to claim 23, wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$.

25. An electronic imaging apparatus having a zoom optical system, the electronic imaging apparatus comprising:
a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07}=0.7y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
wherein the zoom optical system has a lens unit B adjacent to the lens unit A and further has, on the image side of the lens unit B and in order from the object side, a negative lens unit C and a positive lens unit D with a spacing between the lens unit C and the lens unit D being variable,
wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$, and
wherein the cemented lens component of the lens unit A includes, in order from an object side, the negative lens $L_{AN}$ and the positive lens $L_{AP}$.

26. An electronic imaging apparatus having a zoom optical system, the electronic imaging apparatus comprising:
a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07}=0.7y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
wherein the zoom optical system has a lens unit B adjacent to the lens unit A and further has, on the image side of the lens unit B, a negative lens unit C and a positive lens unit D with a spacing between the lens unit C and the lens unit D being variable,
wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$, and wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1-(1+k)h^2/R^2\}^{1/2}]} + A_4 h^4 + A_6 h^6 + A_8 h^8 + A_{10} h^{10} + \ldots \quad (a)$$

the zoom optical system satisfies the following condition:

$$0.1 \leq |z_{AR}(h) - z_{AC}(h)|/tp \leq 0.96$$

where $z_{AC}$ is a shape of a cementation-side surface, according to Equation (a), of the positive lens $L_{AP}$; $z_{AR}$ is a shape of an air-contact-side surface, according to Equation (a), of the positive lens $L_{AP}$; h is expressed by h=0.7fw when the focal length of the entire system of the zoom optical system at the wide-angle position is denoted by fw; tp is a thickness, measured along the optical axis, of the positive lens $L_{AP}$, and always z (0)=0.

27. An electronic imaging apparatus having a zoom optical system, the electronic imaging apparatus comprising:
a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
wherein the zoom optical system has a lens unit B adjacent to the lens unit A and further has, on the image side of the lens unit B, a negative lens unit C and a positive lens unit D with a spacing between the lens unit C and the lens unit D being variable, and
wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1-(1+k)h^2/R^2\}^{1/2}]} + A_4 h^4 + A_6 h^6 + A_8 h^8 + A_{10} h^{10} + \ldots \quad (a)$$

the zoom optical system satisfies the following conditions:

$$-50 \leq k_{AF} \leq 10$$

$$-20 \leq k_{AR} \leq 20$$

and further satisfies the following condition:

$$-8 \leq z_{AF}(h)/z_{AR}(h) \leq 2$$

where $k_{AF}$ is a k value relative to a most object-side surface of the lens unit A and $k_{AR}$ is a k value relative to a most image-side surface of the lens unit A, each of which is the k value in Equation (a); $z_{AF}$ is a shape of the most object-side surface of the lens unit A; $z_{AR}$ is a shape of the most image-side surface of the lens unit A; and h is expressed by h=0.7 fw when the focal length of the entire system of the zoom optical system at the wide-angle position is denoted by fw.

28. An electronic imaging apparatus having a zoom optical system according to claim 24,
wherein a cementing surface of the cemented lens component of the lens unit A is configured as an aspherical surface.

29. An electronic imaging apparatus having a zoom optical system, the electronic imaging apparatus comprising:
a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and
an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed,
wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position,
wherein the zoom optical system has a lens unit B adjacent to the lens unit A and further has, on the image side of the lens unit B, a negative lens unit C and a positive lens unit D with a spacing between the lens unit C and the lens unit D being variable, wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$, wherein a cementing surface of the cemented lens component of the lens unit A is configured as an aspherical surface, and wherein the aspherical surface of the cementing surface of the cemented lens component of the lens unit A has a convergence property stronger than in a spherical surface in going from the optical axis to a periphery.

30. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, wherein the zoom optical system has a lens unit B adjacent to the lens unit A and further has, on the image side of the lens unit B, a negative lens unit C and a positive lens unit D with a spacing between the lens unit C and the lens unit D being variable, wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$, wherein a cementing surface of the cemented lens component of the lens unit A is configured as an aspherical surface, and wherein a difference of the refractive index relative to the d line between the positive lens $L_{AP}$ and the negative lens $L_{AN}$ is 0.2 or less.

31. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, wherein the zoom optical system has a lens unit B adjacent to the lens unit A and further has, on the image side of the lens unit B, a negative lens unit C and a positive lens unit D with a spacing between the lens unit C and the lens unit D being variable, and wherein the zoom optical system satisfies the following condition:

$$0.2 \leq d_{CD}/fw \leq 1.2$$

where $d_{CD}$ is a spacing along the optical axis between the lens unit C and the lens unit D in infinite focusing at the wide-angle position and fw is the focal length of the entire system of the zoom optical system at the wide-angle position.

32. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, and wherein the zoom optical system has a lens unit B adjacent to the lens unit A, and further has a positive lens unit C that includes a positive lens alone and a lens unit D that includes a meniscus lens with a convex surface facing the image side, the positive lens unit C and the lens unit D being arranged on the image side of the lens unit B with a spacing between the lens unit C and the lens unit D being variable.

33. An electronic imaging apparatus having a zoom optical system according to claim 32, wherein the lens unit A includes a cemented lens component of a positive lens $L_{AP}$ and a negative lens $L_{AN}$, and the positive lens $L_{AP}$ is a lens using energy curing resin and is configured directly on the negative lens $L_{AN}$.

34. An electronic imaging apparatus having a zoom optical system according to claim 33, wherein the cemented lens component of the lens unit A includes, in order from an object side, the negative lens $L_{AN}$ and the positive lens $L_{AP}$.

35. An electronic imaging apparatus having a zoom optical system according to claim 33, wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (a)$$

the zoom optical system satisfies the following condition:

$$0.1 \leq |z_{AR}(h) - z_{AC}(h)|/tp \leq 0.96$$

where $z_{AC}$ is a shape of a cementation-side surface, according to Equation (a), of the positive lens $L_{AP}$; $z_{AR}$ is a shape of an air-contact-side surface, according to Equation (a), of the positive lens $L_{AP}$; h is expressed by h=0.7fw when the focal length of the entire system of the zoom optical system at the wide-angle position is denoted by fw; tp is a thickness, measured along the optical axis, of the positive lens $L_{AP}$, and always z (0)=0.

36. An electronic imaging apparatus having a zoom optical system according to claim 32 or 33, wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \quad (a)$$

the zoom optical system satisfies the following conditions:

$$-50 \leq k_{AF} \leq 10$$

$$-20 \leq k_{AR} \leq 20$$

and further satisfies the following condition:

$$-8 \leq z_{AF}(h)/z_{AR}(h) \leq 2$$

where $k_{AF}$ is a k value relative to a most object-side surface of the lens unit A and $k_{AR}$ is a k value relative to a most image-side surface of the lens unit A, each of which is the k value in Equation (a); $z_{AF}$ is a shape of the most object-side surface of the lens unit A; $z_{AR}$ is a shape of the most image-side surface of the lens unit A; and h is expressed by h=0.7 fw when the focal length of the entire system of the zoom optical system at the wide-angle position is denoted by fw.

37. An electronic imaging apparatus having a zoom optical system according to claim 33, wherein a cementing surface of the cemented lens component of the lens unit A is configured as an aspherical surface.

38. An electronic imaging apparatus having a zoom optical system according to claim 37, wherein the aspherical surface of the cementing surface of the cemented lens component of the lens unit A has a convergence property stronger than in a spherical surface in going from the optical axis to a periphery.

39. An electronic imaging apparatus having the zoom optical system according to claim 37 or 38, wherein a difference of the refractive index relative to the d line between the positive lens $L_{AP}$ and the negative lens $L_{AN}$ is 0.2 or less.

40. An electronic imaging apparatus having a zoom optical system, the electronic imaging apparatus comprising:

a zoom optical system in which a most object-side lens unit A includes one biconcave-shaped negative lens component, each of air-contact-surfaces of which is configured as an aspherical surface, and when a magnification of the zoom optical system is changed in a range from a wide-angle position to a telephoto position, the lens unit A is moved back and forth along an optical axis in such a way that the lens unit A is initially moved toward an image side; and an electronic imaging unit that has an electronic image sensor in the proximity of an imaging position of the zoom optical system so that an image formed through the zoom optical system is picked up by the electronic image sensor and image data picked up by the electronic image sensor are electrically processed and can be output as image data whose format is changed, wherein in nearly infinite object point focusing, the zoom optical system satisfies the following condition:

$$0.7 < y_{07}/(fw \cdot \tan \omega_{07w}) < 0.94$$

where $y_{07}$ is expressed by $y_{07} = 0.7 y_{10}$ when $y_{10}$ denotes a distance from a center to a point farthest from the center (a maximum image height) within an effective imaging surface (an imageable surface) of the electronic image sensor, $\omega_{07w}$ is an angle made by a direction of an object point corresponding to an image point that is formed distant from the center of the imaging surface by $y_{07}$ on the imaging surface at the wide-angle position, with the optical axis, and fw is a focal length of an entire system of the zoom optical system at the wide-angle position, and wherein the zoom optical system has a lens unit B adjacent to the lens unit A; a distance along the optical axis between the lens unit A and the lens unit B is varied for a purpose of changing the magnification; the biconcave-shaped negative lens component of the lens unit A includes a cemented lens component of a positive lens $L_{AP}$ and a negative lens $L_{AN}$; and in an orthogonal coordinate system in which an axis of abscissas is taken as vdp and an axis of ordinates is taken as θgFp, when a straight line expressed by $$\theta gFp = \alpha p \times vdp + \beta p \text{ (where } \alpha p = -0.00163)$$

is set, a coordinate (vdp, θgFp) of the positive lens $L_{AP}$ is contained in an overlapped region of a region defined between a straight line in a lower limit of Condition (a) described below and a straight line in an upper limit of Condition (a) and a region defined by Condition (b) described below:

$$0.6400 < \theta p < 0.9000 \qquad (a)$$

$$3 < vdp < 27 \qquad (b)$$

where θgFp is a partial dispersion ratio (ng−nF)/(nF−nC) of the positive lens $L_{AP}$, vdp is an Abbe's number (nd−1)/(nF−nC) of the positive lens $L_{AP}$, nd is a refractive index relative to the d line, nC is a refractive index relative to the C line, nF is a refractive index relative to the F line, and ng is a refractive index relative to the g line.

41. An electronic imaging apparatus having a zoom optical system according to claim 40,
   wherein the cemented lens component of the lens unit A includes, in order from an object side, the negative lens $L_{AN}$ and the positive lens $L_{AP}$.

42. An electronic imaging apparatus having a zoom optical system according to claim 40,
   wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \qquad (a)$$

the zoom optical system satisfies the following condition:

$$0.1 \leq |z_{AR}(h) - z_{AC}(h)|/tp \leq 0.96$$

where $z_{AC}$ is a shape of a cementation-side surface, according to Equation (a), of the positive lens $L_{AP}$; $z_{AR}$ is a shape of an air-contact-side surface, according to Equation (a), of the positive lens $L_{AP}$; h is expressed by h=0.7 fw when the focal length of the entire system of the zoom optical system at the wide-angle position is denoted by fw; tp is a thickness, measured along the optical axis, of the positive lens $L_{AP}$, and always z (0)=0.

43. An electronic imaging apparatus having a zoom optical system according to claim 40,
   wherein when z is taken as a coordinate in a direction of the optical axis, h is taken as a coordinate normal to the optical axis, k represents a conic constant, $A_4$, $A_6$, $A_8$, and $A_{10}$ represent aspherical coefficients, R represents a radius of curvature of a spherical component on the optical axis, and a configuration of an aspherical surface is expressed by the following equation:

$$z = \frac{h^2}{R[1 + \{1 - (1+k)h^2/R^2\}^{1/2}]} + A_4 h^4 + A_6 h^6 + A_8 h^8 + A_{10} h^{10} + \ldots \qquad (a)$$

the zoom optical system satisfies the following conditions:

$$-50 \leq k_{AF} \leq 10$$

$$-20 \leq k_{AR} \leq 20$$

and further satisfies the following condition:

$$-8 \leq z_{AF}(h)/z_{AR}(h) \leq 2$$

where $k_{AF}$ is a k value relative to a most object-side surface of the lens unit A and $k_{AR}$ is a k value relative to a most image-side surface of the lens unit A, each of which is the k value in Equation (a); $z_{AF}$ is a shape of the most object-side surface of the lens unit A; $z_{AR}$ is a shape of the most image-side surface of the lens unit A; and h is expressed by h=0.7 fw when the focal length of the entire system of the zoom optical system at the wide-angle position is denoted by fw.

44. An electronic imaging apparatus having a zoom optical system according to claim 40,
   wherein in an orthogonal coordinate system in which an axis of abscissas is taken as vdp and an axis of ordinates is taken as θhgp, when a straight line expressed by $$\theta hgp = \alpha hgp \times vdp + \beta hgp \text{ (where } \alpha hgp = -0.00225)$$

is set, a coordinate (vdp, θhgp) of the positive lens $L_{AP}$ is contained in an overlapped region of a region defined between a straight line in a lower limit of Condition (c) described below and a straight line in an upper limit of Condition (c) and a region defined by Condition (b) described below:

$$0.5700 < \beta hgp < 0.9500 \qquad (c)$$

$$3 < vdp < 27 \qquad (b)$$

where θhgp is a partial dispersion ratio (nh−ng)/(nF−nC) of the positive lens $L_{AP}$, and nh is a refractive index relative to the h line.

45. An electronic imaging apparatus having a zoom optical system according to claim 40,
   wherein a cementing surface of the cemented lens component of the lens unit A is configured as an aspherical surface.

46. An electronic imaging apparatus having a zoom optical system according to claim 45,
   wherein the aspherical surface of the cementing surface of the cemented lens component of the lens unit A has a convergence property stronger than in a spherical surface in going from the optical axis to a periphery.

47. An electronic imaging apparatus having the zoom optical system according to claim 45 or 46,
   wherein a difference of the refractive index relative to the d line between the positive lens $L_{AP}$ and the negative lens $L_{AN}$ is 0.2 or less.

48. An electronic imaging apparatus having a zoom optical system according to claim 40,
   wherein the zoom optical system further has, on the image side of the lens unit B, a negative lens unit C and a positive lens unit D with a spacing between the lens unit C and the lens unit D being variable.

49. An electronic imaging apparatus having a zoom optical system according to claim 48,
   wherein the zoom optical system satisfies the following condition:

$$0.2 \leq d_{CD}/fw \leq 1.2$$

where $d_{CD}$ is a spacing along the optical axis between the lens unit C and the lens unit D in infinite focusing at the wide-angle position and fw is the focal length of the entire system of the zoom optical system at the wide-angle position.

50. An electronic imaging apparatus having a zoom optical system according to claim 40,
   wherein the zoom optical system further has a positive lens unit C including a positive lens alone.

* * * * *